(12) United States Patent
Sakai et al.

(10) Patent No.: US 10,477,518 B2
(45) Date of Patent: Nov. 12, 2019

(54) COMMUNICATION APPARATUS, COMMUNICATION METHOD, AND PROGRAM

(71) Applicant: SONY CORPORATION, Tokyo (JP)

(72) Inventors: Eisuke Sakai, Tokyo (JP); Yuichi Morioka, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 164 days.

(21) Appl. No.: 15/547,842

(22) PCT Filed: Dec. 7, 2015

(86) PCT No.: PCT/JP2015/084334
§ 371 (c)(1),
(2) Date: Aug. 1, 2017

(87) PCT Pub. No.: WO2016/139862
PCT Pub. Date: Sep. 9, 2016

(65) Prior Publication Data
US 2018/0027526 A1    Jan. 25, 2018

(30) Foreign Application Priority Data
Mar. 5, 2015    (JP) ................................ 2015-043409

(51) Int. Cl.
*H04W 72/04*    (2009.01)
*H04W 52/04*    (2009.01)
(Continued)

(52) U.S. Cl.
CPC ........... *H04W 72/04* (2013.01); *H04W 52/04* (2013.01); *H04W 84/12* (2013.01); *H04W 74/0808* (2013.01)

(58) Field of Classification Search
CPC .............. H04W 72/04; H04W 72/042; H04W 72/0446; H04W 72/0453; H04W 72/0473;
(Continued)

(56) References Cited

U.S. PATENT DOCUMENTS

2008/0056177 A1    3/2008    Mori et al.

FOREIGN PATENT DOCUMENTS

| JP | 2008-211601 A | 9/2006 |
| JP | 2008-60994 A | 3/2008 |

(Continued)

OTHER PUBLICATIONS

International Search Report dated Mar. 1, 2016 in PCT/JP2015/084334 filed Dec. 7, 2015.

*Primary Examiner* — Ian N Moore
*Assistant Examiner* — Brian T Le
(74) *Attorney, Agent, or Firm* — Xsensus LLP

(57) ABSTRACT

A communication apparatus including: a control unit that performs setting related to a transmission resource depending on a communication parameter decided on the basis of signal power information varying in accordance with a transmit power level; and a communication unit that transmits a frame in accordance with the setting related to the transmission resource. The communication apparatus, a communication method, and a program can equalize communication efficiencies of a plurality of communication apparatuses while maintaining or enhancing overall communication efficiency of a communication system composed of the plurality of communication apparatuses.

20 Claims, 11 Drawing Sheets

(51) Int. Cl.
*H04W 84/12* (2009.01)
*H04W 74/08* (2009.01)

(58) Field of Classification Search
CPC ..... H04W 52/04; H04W 52/08; H04W 52/10; H04W 52/143; H04W 52/146; H04W 84/12; H04W 74/0808
See application file for complete search history.

(56) References Cited

FOREIGN PATENT DOCUMENTS

| | | |
|---|---|---|
| JP | 2012-209836 A | 10/2012 |
| JP | 2015-15552 A | 1/2015 |
| WO | 2009/113137 A1 | 9/2009 |

COMMUNICATION APPARATUS, COMMUNICATION METHOD, AND PROGRAM

TECHNICAL FIELD

The present disclosure relates to a communication apparatus, a communication method, and a program.

BACKGROUND ART

Since a wireless local area network (LAN) represented by IEEE (Institute of Electrical and Electronics Engineers) 802.11 has recently been propagated, wireless communication apparatuses corresponding to the wireless LAN are increasingly being used. Here, when multiple wireless communication apparatuses are located within communication ranges thereof, communication efficiency may deteriorate due to the generation of radio wave interference and the like.

To solve such a problem, Patent Literature 1 discloses an invention relating to a wireless communication apparatus that decides a level of a wireless LAN environment on the basis of a carrier-to-noise (C/N) ratio with respect to received carriers and performs transmission with a transmit power value corresponding to the decided level. According to the invention disclosed in Patent Literature 1, it is possible to reduce power consumption while maintaining communication efficiency because transmit power can be decreased when a wireless LAN environment is favorable whereas the transmit power can be increased when the wireless LAN environment is unfavorable.

CITATION LIST

Patent Literature

Patent Literature 1: JP 2008-211601A

DISCLOSURE OF INVENTION

Technical Problem

However, in the invention disclosed in Patent Literature 1, when a wireless communication apparatus that performs transmit power control and a wireless communication apparatus that does not perform the control are present, communication efficiency of one of these wireless communication apparatuses may be relatively decreased. For example, one of wireless communication apparatuses having the same communication distance performs transmission with transmit power of a predetermined value without controlling the transmit power, and the other wireless communication apparatus performs transmission with transmit power lower than the predetermined value by controlling the transmit power. In this case, radio waves transmitted by the latter wireless communication apparatus are unlikely to be received than radio waves transmitted by the former wireless communication apparatus.

Further, the above problem may be generated between wireless communication apparatuses that do not perform transmission control. For example, when one of wireless communication apparatuses having the same transmit power is located a predetermined distance from a wireless communication apparatus corresponding to a destination and the other wireless communication apparatus is located far away from the predetermined distance from the wireless communication apparatus corresponding to the destination, radio waves transmuted by the latter wireless communication apparatus are unlikely to be received than radio waves transmitted by the former wireless communication apparatus.

Accordingly; the present disclosure proposes a novel and improved communication apparatus, communication method and program for equalizing communication efficiencies of a plurality of communication apparatuses while maintaining or enhancing overall communication efficiency of a communication system composed of the plurality of communication apparatuses.

Solution to Problem

According to the present disclosure, there is provided a communication apparatus including: a control unit that performs setting related to a transmission resource depending on a communication parameter decided on the basis of signal power information varying in accordance with a transmit power level, and a communication unit that transmits a frame in accordance with the setting related to the transmission resource.

Further, according to the present disclosure, there is provided a communication apparatus including, a communication unit that transmits information related to a communication parameter decided on the basis of signal power information varying in accordance with a transmit power level.

Further, according to the present disclosure, there is provided a communication method including: causing a control unit to perform setting related to a transmission resource depending on a communication parameter decided on the basis of signal power information varying in accordance with a transmit power level; and transmitting a frame in accordance with the setting related to the transmission resource.

Further, according to the present disclosure, there is provided a communication method including: causing a communication unit to transmit information related to a communication parameter decided on the basis of signal power information varying in accordance with a transmit power level.

Further, according to the present disclosure, there is provided a program for causing a computer to realize: a control function of performing setting related to a transmission resource depending on a communication parameter decided on the basis of signal power information varying in accordance with a transmit power level; and a communication function of transmitting a frame in accordance with the setting related to the transmission resource.

Further, according to the present disclosure, there is provided a program for causing a computer to realize a communication function of transmitting information related to a communication parameter decided on the basis of signal power information varying in accordance with a transmit power level.

Advantageous Effects of Invention

According to the above-described present disclosure, a communication apparatus, a communication method and a program which can equalize communication efficiencies of a plurality of communication apparatuses while maintaining or enhancing overall communication efficiency of a communication system composed of the plurality of communication apparatuses are provided. Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 8 is a diagram illustrating an example of a frame conversion sequence in an eighth modified example of the embodiment.

MODE(S) FOR CARRYING OUT THE INVENTION

Figure 1:
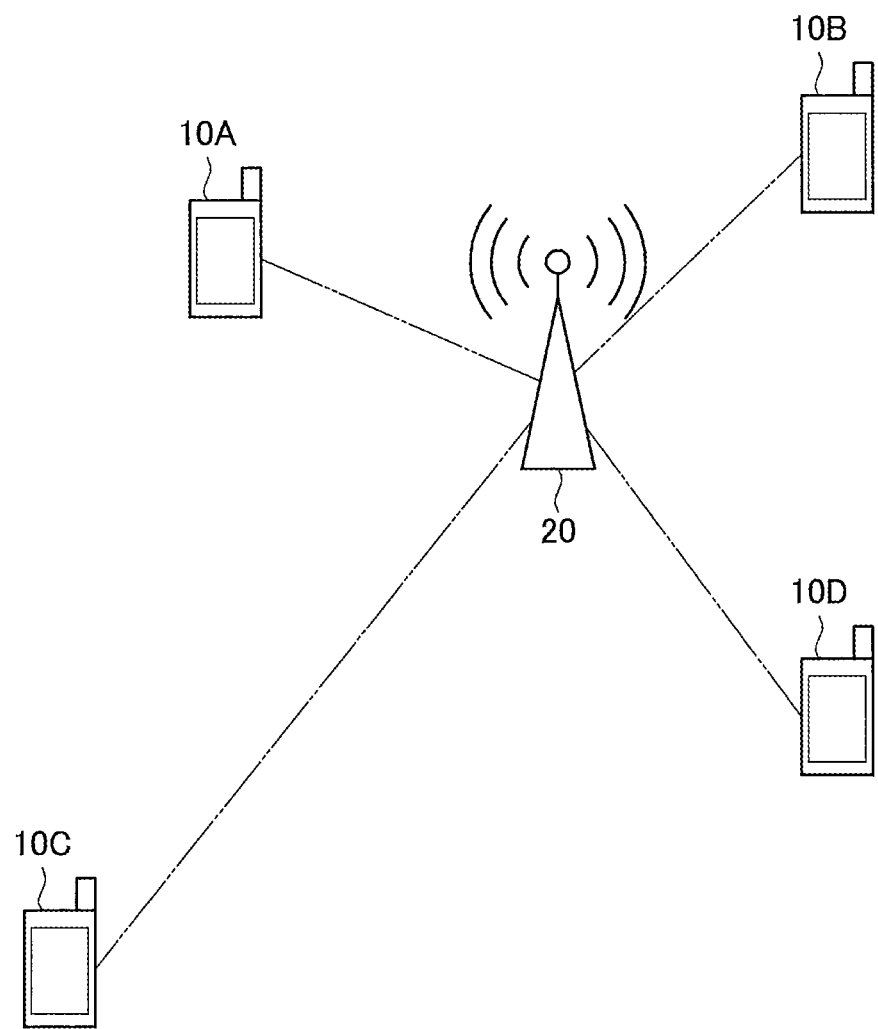
FIG. 1 is a diagram illustrating a configuration example of a communication system including communication apparatuses according to an embodiment of the present disclosure.

Hereinafter, (a) preferred embodiment(s) of the present disclosure will be described in detail with reference to the appended drawings. In this specification and the appended drawings, structural elements that have substantially the same function and structure are denoted with the same reference numerals, and repeated explanation of these structural elements is omitted.

Meanwhile, a description will be given in the following order.
1. Overview of Communication Apparatus According to Embodiment of Present Disclosure
2. Embodiment of Present Disclosure
2-1. Configuration of Apparatus
2-2. Process of Apparatus
2-3. Modified Examples
3. Application Example
4. Conclusion 1. Overview of Communication Apparatus According to Embodiment of Present Disclosure First, an overview of a communication apparatus according to an embodiment of the present disclosure will be described with reference to FIG. 1. FIG. 1 is a diagram illustrating a configuration example of a communication system including communication apparatuses according to an embodiment of the present disclosure.

The communication system includes a communication apparatus 10 and a communication apparatus 20. The communication apparatus 10 and the communication apparatus 20 have a wireless communication function. In addition, the communication apparatus 20 operates as an access point (referred to as an AP (Access Point) hereinafter) and the communication apparatus 10 operates as a station (referred to as a STA (Station) hereinafter). Hereinafter, the communication apparatus 20 is referred to as the AP 20 and the communication apparatus 10 is referred to as the STA 10. Accordingly, a plurality of STAs 10 may be connected to each other or connected to other networks through wireless communication with the AP 20 in the communication system. Meanwhile, communication from the AP 20 to the STA 10 is referred to as downlink (DL) and communication from the STA 10 to the AP 20 is referred to as uplink (UL).

For example, the communication system may be composed of the AP 20 and a plurality of STAs 10A to 10D, as illustrated in FIG. 1. The AP 20 and the STAs 10A to 10D are connected through wireless communication and directly transmit/receive frames to/from each other.

Here, whether a signal is correctly received is affected by a ratio of noise power to a received signal power (a signal-to-noise ratio (SN ratio)) in wireless communication. In general, the received signal power level that is, a received signal strength decreases in proportion to a radio wave propagation distance. For example, when radio waxes are transmitted with the same transmit power, it becomes more difficult for a communication apparatus at a receiving side to correctly receive the radio waves as a communication distance increases.

Further, when a communication apparatus that is located closer to a communication counterpart, for example, an AP than another communication apparatus, transmits radio waves to the AP with a higher transmit power than transmit power of other communication apparatuses, power is consumed, and the communication apparatus may become a source of radio wave interference for the other communication apparatuses. As a result, overall throughput of the wireless communication system may be decreased.

On the other hand, a technology related to transmit power control (referred to as TPC (Transmit Power Control) hereinafter) has been proposed. For example, each communication apparatus having TPC decides transmit power such that an SN ratio at which a communication apparatus at a receiving side can receive radio waves is maintained and a corresponding communication apparatus does not become a source of radio wave interference for other communication apparatuses longer distances from the communication apparatus at the receiving side than the corresponding communication apparatus. Accordingly, the corresponding communication apparatus can perform communication while suppressing influence on radio waves transmitted by the other communication apparatuses, so that throughput of the wireless communication system is increased.

However, when a communication, apparatus that performs TPC and a communication apparatus that does not perform TPC are present, communication efficiency of one of these communication apparatuses may be relatively deteriorated. For example, one of communication apparatuses having the same communication distance performs transmission with transmit power of a predetermined value without performing TPC and the other communication apparatus performs transmission with a lower transmit power than the predetermined value by performing TPC. In this case, radio waves transmitted by the latter communication apparatus have a lower SN ratio than radio waves transmitted by the former communication apparatus and thus are difficult to receive.

Further, the above problem, may be generated between communication apparatuses that do not perform TPC for example, when one of communication apparatuses having the same transmit power is located a predetermined distance from a communication apparatus corresponding to a destination, for example, an AP, and the other communication apparatus is located a longer distance than the predetermined distance from the AP, radio waves transmitted by the latter communication apparatus have a lower SN ratio than radio waves transmitted by the former communication apparatus and thus are difficult to receive.

Accordingly, the present disclosure proposes a communication apparatus, a communication method and a program which can equalize communication efficiencies of a plurality of communication apparatuses while maintaining or enhancing overall communication efficiency of a communication system composed of the plurality of communication apparatuses. Details thereof will be described hereinafter. Meanwhile, although an example of a communication system in which the communication system includes the AP 20 and STAs 10 has been described in FIG. 1, one of the STAs 10 may be a communication apparatus having a plurality of direct links to the other STAs 10 instead of the AP 20. In this case, the aforementioned DL may be replaced by "simultaneous transmission from one STA to a plurality of STAs" and the aforementioned UL may be replaced by "simultaneous transmission from the plurality of STAs to one STA."

2. Embodiment of Present Disclosure

The overview of the communication apparatus according to an embodiment of the present disclosure has been described. Next, the communication apparatus according to an embodiment of the present disclosure will be described in detail.

2-1. Configuration of Apparatus

Figure 2:
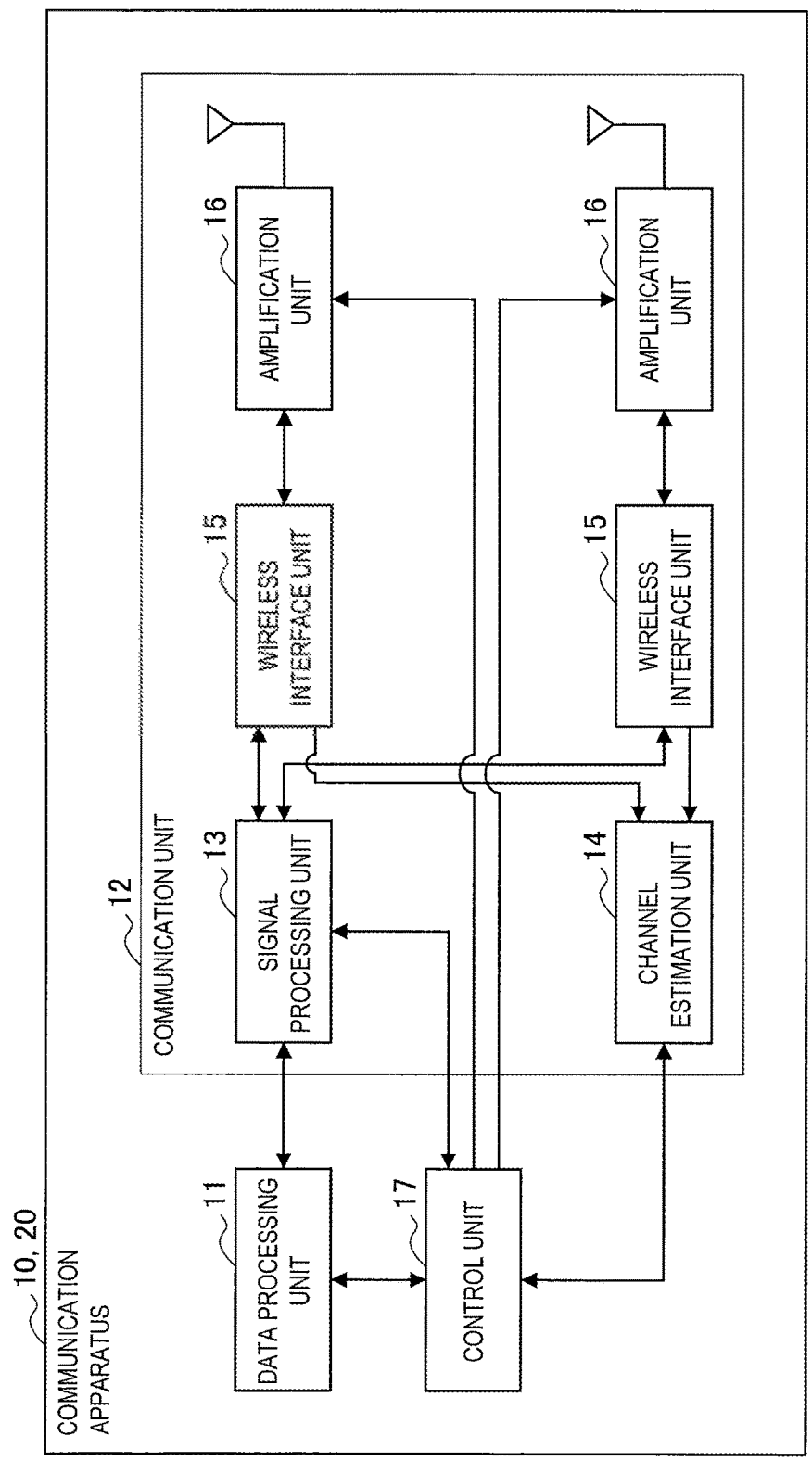
FIG. 2 is a block diagram illustrating a schematic functional configuration of an STA and an AP according to an embodiment of the present disclosure.

First, a configuration of the STA 10 and the AP 20 according to an embodiment of the present disclosure will be described with reference to FIG. 2. FIG. 2 is a block diagram illustrating a schematic functional configuration of the STA 10 and the AP 20 according to an embodiment of the present disclosure.

As shown in FIG. 2, the STA 10 and the AP 20 include a data processing unit 11, a communication unit 12, and a control unit 17. Firstly, basic functions of the STA 10 and the AP 20 will be described.
((Basic Functions))

The data processing unit 11 performs a process for transmission and reception of data. Specifically, the data processing unit 11 generates a frame based on data from a higher-level layer of communication, and provides the generated frame to a signal processing unit 13 described below. For example, the data processing unit 11 generates a frame (or packets) from data, and performs processes, such as addition of a MAC header for media access control (MAC), addition of an error detection code, and the like, on the generated frame. The data processing unit 11 also extracts data from a received frame, and provides the extracted data to a higher-level layer of communication. For example, the data processing unit 11 obtains data by performing, on a received frame, analysis of a MAC header, detection and correction of code error, a reordering process, and the like.

The communication unit 12 includes a signal processing unit 13, a channel estimation unit 14, wireless interface units 15 and amplification units 16, as illustrated in FIG. 2.

Further, although not shown in the figure, a fixed power supply or a power supply such as a battery is installed in the STA 10 and the AP 20.

The signal processing unit 13 performs a modulation process and the like on frames. Specifically, the signal processing unit 15 performs encoding, interleaving, and modulation on frames supplied by the data processing unit 11 in accordance with a coding and modulation scheme or the like set by the control unit 17 to generate a symbol stream. In addition, the signal processing unit 13 supplies the generated symbol stream to the wireless interface unit 15. Further, the signal processing unit 13 performs demodulation, decoding, and the hive on a symbol stream related to a signal acquired from the wireless interface unit 15 to acquire frames and supplies the acquired frames to the data processing unit 11 or the control unit 17. Meanwhile, the signal processing unit 13 may perform a multiplexing process.

The channel estimation unit 14 estimates channel gains. Specifically, the channel estimation unit 14 calculates complex channel gain information from a preamble part or a training signal part of a signal related to the symbol stream acquired from the wireless interface unit 15. Further, the calculated complex channel gam information is supplied to the signal processing unit 13 through the control unit and used for a modulation process and the like.

The wireless interface unit 15 generates a signal transmitted and received through an antenna. Specifically, the wireless interface unit 15 converts a signal related to the symbol stream supplied by the signal processing unit 13 into an analog signal, filters the analog signal and performs frequency upconversion on the filtered signal. In addition, the wireless interface unit 15 provides the acquired signal to the amplification unit 16. In addition, the wireless interface unit 15 performs a reverse process of a process for signal transmission, for example, frequency downconversion, digital signal conversion and the like, on a signal acquired from the amplification unit 16, and provides the signal acquired through the process to the channel estimation unit 14 and the signal processing unit 13. Meanwhile, the communication unit 12 may not include a plurality of wireless interface units 15.

The amplification unit 16 performs amplification of a signal and transmission and reception of the signal. Specifically, the amplification unit 16 amplifies an analog signal supplied by the wireless interface unit 15 to a predetermined power level and transmits the signal acquired through the amplification through an antenna. In addition, the amplification unit 16 amplifies a signal related to radio waves received through the antenna to a predetermined power level and provides tire signal acquired through the amplification to the wireless interface unit 15. For example, the amplification unit may be an amplifier. Meanwhile, one or both of a transmitted radio wave amplification function and a received radio wave amplification function of the amplification unit 16 may be included in the wireless interface unit 15.

Meanwhile, the signal processing unit 13, the channel estimation unit 14, the wireless interface unit 15, and the amplification unit 16 are collectively referred to as the communication unit 12 hereinafter.

The control unit 17 controls the overall operation of the STA 10 or the AP 20. Specifically, the control unit 17 performs an exchange of information between functions, a setting of a communication parameter, a scheduling of frames (or packets) in the data processing unit 11, and the like.

((Function of STA))
Next, functions of the STA 10 will be described.
(TPC Function)

The control unit 17 performs TPC in the STA 10. Specifically, the control unit 17 decides the presence or absence of TPC and details of the TPC and instructs that the amplification unit 16 be set on the basis of the decision. More specifically, when it is decided that TPC is performed, the control unit 17 decides a transmit power value on the basis of information received from the AP 20 and varying in response to a transmit power level (referred to as signal power information hereinafter) and causes the amplification unit 16 to set the decided transmit power value. For example, the control unit 17 sets a transmit power value, as signal power information, included in a communication parameter notification received from the AP 20, which will be described below as transmit power. Meanwhile, a transmit power density (transmit power spectral density) may be controlled in TPC.

Further, when it is decided that TPC is not performed, the control unit 17 may not instruct that transmit power for the amplification unit 16 be set or may instruct that a predetermined value (referred to as a default value hereinafter), for example, a transmit power value generally used in wireless LAN communication, be set for the amplification unit 16.

The communication unit 12 pet forms amplification of a transmitted signal on the basis of an instruction of the control unit 17. Specifically, when the control unit 17 instructs that a transmit power value be set, the amplification unit 16 sets transmit power to the instructed value. Further, when the control unit 17 does not instruct that a transmit power value be set or instructs that the default value be set, the amplification unit 16 sets the transmit power to the default value. In addition, the amplification unit 16 amplifies a signal supplied by the wireless interface unit 15 to the set transmit power. Further, when TPC is performed at a transmit power density, a transmitted signal is amplified depending on the frequency of the transmitted signal.

(Communication Parameter Setting Function)

The control unit 17 acquires a communication parameter used in TPC. Specifically, when it is decided that TPC is performed, the control unit 17 acquires the communication parameter from the AP 20 through communication. For example, the control unit 17 controls the data processing unit 11 to generate a communication parameter transmission request frame (referred to as a communication parameter request hereinafter) and controls the communication unit 12 to transmit the generated communication parameter request to the AP 20 when it is decided that TPC is performed.

In addition, the control unit 17 performs setting related to transmission resources in accordance with the acquired communication parameter. Specifically, the acquired communication parameter is a first parameter for deciding a frame transmission waning time duration, and the control unit 17 sets a frame transmission waiting time on the basis of the parameter. For example, the transmission waiting time duration may be a fixed duration.

More specifically the parameter for deciding the fixed transmission waiting time duration may be an inter-frame space (IFS) as defined in IEEE 802.11. In addition, the control unit 17 sets an IFS acquired from the AP 20 through communication as the transmission waiting time duration. Meanwhile, the IFS is a waiting time from when a channel enters an idle state to when frame transmission is initiated. Further, the IFS has different durations, that is, types, for different frame types. For example, a short IFS (SIFS), a point coordination function IFS (PIFS), a distributed coordination function IFS (DIFS), a reduced IFS (RIFS), an arbitration IFS (AIFS), an extended IFS (EIFS) or the like is selected as an IFS.

In addition, the parameter for deciding the fixed transmission waiting time duration may be a slot time that is a part of the IFS as defined in IEEE 802.11. For example, the PIFS is an IFS used for transmitting a frame (PS-POLL) for notifying the STA 10 that band reservation was performed for the STA 10 and is defined as SIFS+slot time×2. Accordingly, the control unit 17 sets the transmission waiting time duration by applying the slot time acquired from the AP 20 through communication to the IFS set in the STA 10. Further, the parameter for deciding the fixed transmission waiting time duration may be the number of slot times instead of a slot time or may be both a slot time and the number of slot times.

The data processing unit 11 generates the communication parameter request on the basis of an instruction of the control unit 17. Specifically, the data processing unit 11 generates the communication parameter request when the control unit 17 instructs that the communication parameter request be generated and provides the generated communication parameter request to the communication unit 12.

In addition, the data processing unit 11 acquires a communication parameter from a frame including information indicating the communication parameter (referred to as a communication parameter notification hereinafter). Specifically, when the communication parameter notification is received, the data processing unit 11 acquires the communication parameter from the communication parameter notification and provides the acquired communication parameter to the control unit 17.

The communication unit 12 transmits a frame supplied by the data processing unit 11. Specifically, when the communication parameter request is supplied by the data processing unit 11, the communication unit 12 performs a transmission process in accordance with the supplied communication parameter request. In addition, the communication unit 12 performs a process of receiving the communication parameter notification that is a response to the communication parameter request.

((Function of AP))
Next, functions of the AP 20 will be described.
(Communication Parameter Notification Function)

The control unit 17 decides a communication parameter used in TPC in the STA 10. Specifically, the control unit U decides the communication parameter on the basis of signal power information when a communication parameter request is received from the STA 10. For example, the control unit 17 decides a transmit power value set in the STA 10 as the signal power information on the basis of at least one of an SN ratio of a signal related to radio waves received from the STA 10 and a received signal strength related to the radio waxes.

In addition, when the decided transmit power value is higher than a default value of transmit power of the STA 10, the control unit 17 decides that an IFS having a longer waiting time duration than the IFS, which is set in the STA 10 in advance, is an IFS, which is a communication parameter. Further, when the decided transmit power value is lower than the default value of transmit power of the STA 10, it is decided that an IFS having a shorter latency time duration than the IFS, which is set in the STA 10 in advance, is the IFS.

Furthermore, when the decided transmit power value is higher than the default value of transmit power of the STA 10, the control unit 17 decides that a slot time is a communication parameter which has a value greater than the default value of the STA 10. Conversely, when the decided transmit power value is lower than the default value of transmit power of the STA 10, the slot time is decided to be a value less than the default value of the STA 10.

Meanwhile, the control unit 17 may decide a communication parameter on the basis of signal power information and a list of communication parameters (referred to as a communication parameter list hereinafter). For example, the AP 20 may separately include a storage unit and a list of communication parameters, such as IFSs or slot times, corresponding to transmit power levels may be stored in the storage unit. Further, the communication parameter list is not limited to a list form and may have various data forms. In addition, radio waves received from the STA 10 may be radio waves related to the communication parameter request or radio waves received before the radio waves related to the communication parameter request are received.

In addition, the control unit 17 notifies the STA 10 of the signal power information and the communication parameter. Specifically, the control unit 17 causes the data processing unit 11 to generate a communication parameter notification including information indicating, the signal power information and the communication parameter, and causes the communication unit 12 to transmit the generated communication parameter notification to the STA 10.

The data processing unit 11 processes the communication parameter request. Specifically, the data processing unit 11 determines whether a received frame is the communication parameter request and notifies the control unit 17 that the communication parameter request was received when the frame is determined to be the communication parameter request. In addition, the data processing unit 11 stores a transmission source of the communication parameter request.

Furthermore, the data processing unit 11 generates the communication parameter notification on the basis of an instruction of the control unit 17. Specifically, when the control unit 17 instructs that the communication parameter notification be generated, the data processing unit 11 generates the communication parameter notification including the communication parameter decided by the control unit 17 and provides the generated communication parameter notification to the communication unit 12. Further, the data processing unit 11 sets the stored transmission source of the communication parameter request to a destination of the communication parameter notification. In addition, the communication parameter notification may include signal power information.

The communication unit 12 performs frame transmitting and receiving processes Specifically, the communication unit 12 performs a process of receiving the communication parameter request. In addition, when the communication parameter notification is supplied from the data processing unit 11, the communication unit 12 performs a process of transmitting the provided communication parameter notification.

2-2. Process of Apparatus

Next, a process of the STA 10 and the AP 20 according to the present embodiment will be described.
(Process of STA 10)

Figure 3:
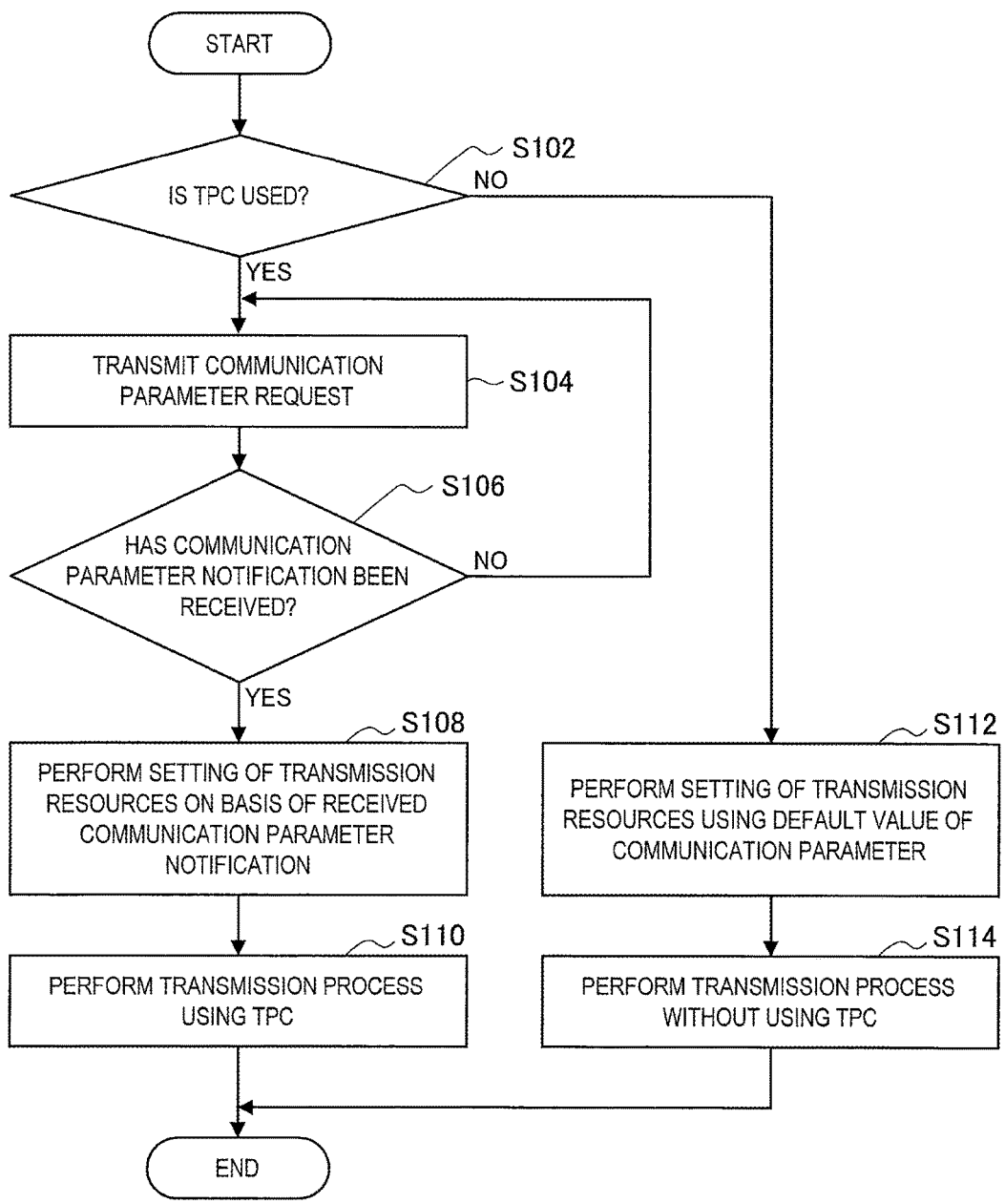
FIG. 3 is a flowchart schematically illustrating a process of an STA according to the embodiment.

First, the process of the STA 10 will be described with reference to FIG. 3. FIG. 3 is a flowchart schematically illustrating the process of the STA 10 according to the present embodiment.

First, the STA 10 determines existence of TPC (step S102). Specifically the control unit 17 decides the presence or absence of IPC and details of settings. For example, the control unit 17 decides the presence or absence of TPC, a transmit power value, and the like when the STA 10 is started, when a higher communication layer requests data transmission when a frame is generated, or periodically.

When it is determined that TPC is performed, the STA 10 transmits a communication parameter request to the AP 20 (step S104). Specifically, when it is decided that TPC is performed, the control unit 17 causes the data processing unit 11 to generate the communication parameter request and causes the communication unit 12 to transmit the generated communication parameter request to the AP 20. In addition, the control unit 17 sets the decided details of settings of TPC, for example, a transmit power, in the communication unit 12, that is, the amplification unit 16.

Next, the STA 10 waits until a communication parameter notification is received (step S106). Specifically, when the communication parameter notification, which is a response to the communication parameter request is received, the communication unit 12 performs a process of receiving the communication parameter notification. Meanwhile, the communication parameter request is retransmitted until a predetermined time elapses from the communication parameter request. When the communication parameter notification is not received within the predetermined time, that is, in the case of timeout, the process proceeds to step S112.

When the communication parameter notification is received, the STA 10 performs setting related to communication resources on the basis of the received communication parameter notification (step S108). Specifically, when the communication parameter notification is received; the control unit 17 sets a transmission waiting time duration of the communication apparatus using a communication parameter, that is, an IFS or a slot time, included in the communication parameter notification.

Then, the STA 10 performs a transmission process using TPC (step S110). Specifically, the communication unit 12 performs a process of transmitting frames with the set transmit power when the period of the set transmission waiting time duration elapses after a related channel enters the idle state.

Further, when it is determined that TPC is not performed in step S102, the STA 10 performs setting related to transmission resources using a default value of the communication parameter (step S112). Specifically, the control unit 17 sets the transmission waiting time duration using a preset default value of an IFS or slot time and does not instruct that transmit power for the communication unit 12 be set, that is, the amplification unit 16.

Subsequently, the STA 10 performs a transmission process without using TPC (step S114). Specifically, the communication unit 12 performs a process of transmitting frames with transmit power corresponding to the default value when the period of the transmission waiting time duration set using the preset default value of the IPS or slot lime elapses after the channel enters the idle state.
(Process of AP 20)

Figure 4:
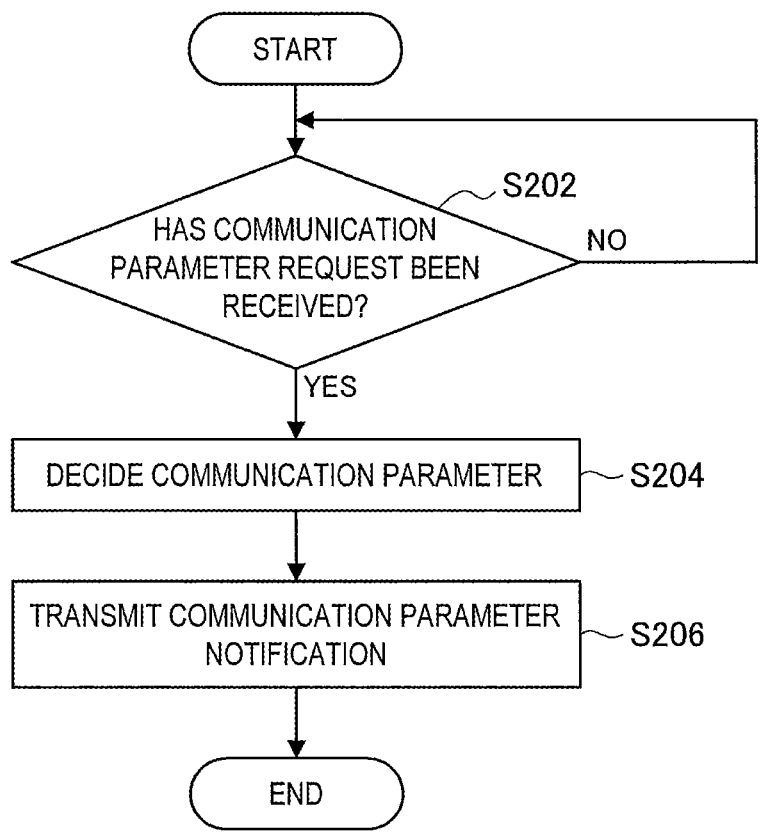
FIG. 4 is a flowchart schematically illustrating a process of an AP according to the embodiment.

Next, a process of the AP 20 will be described with reference to FIG. 4. FIG. 4 is a flowchart schematically illustrating the process of the AP 20 according to the present embodiment.

First, the AP 20 waits until a communication parameter request is received from the STA 10 (step S202). Specifically, when the communication parameter request is received, the communication unit 12 performs a process of receiving the communication parameter request. In addition the communication unit 12 calculates an SN ratio or a seemed signal strength of at least one of radio waves which are received during a period lasting until the communication parameter request is received and stores the calculated value in a storage unit separately included in the AP 20.

When the communication parameter request is received, the AP 20 decides a communication parameter (step S204). Specifically, when the communication parameter request is received, the control unit 17 decides transmit power on the basis of an SN ratio or a received signal strength value of radio waves transmitted from a transmission source of the communication parameter request, which is stored in the storage unit. Then, the control unit 17 decides the communication parameter, for example, an IFS value on the basis of the decided transmit power value and a default value of transmit power of the STA 10.

Subsequently, the AP 20 transmits a communication parameter notification to the STA 10 (step S206). Specifically, the control unit 17 causes the data processing unit 11 to generate a communication parameter notification including information indicating the decided communication parameter and causes the communication unit 12 to transmit the generated communication parameter notification to the STA 10, which is the transmission source of the communication parameter request.

As a result, according to an embodiment of the present disclosure, the STA 10 performs setting related to transmission resources depending on a communication parameter decided on the basis of signal power information varying in accordance with a transmit power level, and transmits frames in accordance with the setting related to the transmission resources. In addition the AP transmits information related to a communication parameter decided depending on signal power information which varies with the transmit power level. Accordingly, frames are transmitted with transmission resources depending on the signal power information cos related to the transmission success probability, and thus a transmission success probability difference between STAs 10 is reduced. Consequently, it is possible to equalize communication efficiencies of a plurality of communication apparatuses while maintaining or improving overall communication efficiency of a communication system composed of the plurality of STAs 10.

In addition, the communication parameter is decided on the basis of the signal power information and list of communication parameters. Accordingly, a communication parameter decision process is simplified and thus a processing speed can be improved. Furthermore, since communication parameters are managed through the list, it is easier to update and change the communication parameter decision process than a case in which the communication parameters are managed inside of the STA 10.

Further, the communication parameter includes the first parameter for deciding a frame transmission waiting time duration, and the STA 10 sets the frame transmission waiting time on the basis of the first parameter. Accordingly, it is possible to prevent a process from being complicated by controlling the transmission waiting time duration, which is more easily changed than communication resource allocation and the like.

Furthermore, the transmission waiting time duration is a fixed duration. Accordingly, the transmission waiting time duration is decided as a communication parameter, and thus a communication parameter decision side, that is, the AP 20, can recognize transmission timing of the STA 109 without other information.

In addition, the STA 10 controls transmit power thereof on the basis of signal power information acquired through reception. Accordingly, transmit power of STAs 10 is decided in the AP 20 that performs communication with a plurality of STAs 10, and thus frames can be transmitted from each STA 10 with appropriate transmit power. Consequently, it is possible to suppress a bad influence on communication of other STAs 10 while maintaining the transmission success probability of the corresponding STA 10.

Further, the STA 10 receives a frame including a communication parameter. Accordingly, the communication parameter is decided by another communication apparatus, and thus a process of the STA 10 can be simplified, processing speed thereof can be improved, and manufacturing costs of the STA 10 can be reduced.

Furthermore, the AP 20 decides a communication parameter on the basis of signal power information and transmits a frame including the communication parameter. Accordingly, the communication parameter is decided in the AP 20, which easily acquires signal power information regarding the STA 10 and thus an efficient communication parameter decision process can be achieved.

2-3. Modified Examples

An embodiment of the present disclosure has been described. Meanwhile, the present embodiment is not limited to the above-described example. First to eighth modified examples of the present embodiment will be described hereinafter.

First Modified Example

As a first modified example of the present embodiment, a transmission waiting time duration set on the basis of a communication parameter may be a variable duration. Specifically, the communication parameter is a value for deciding a variable value variation range of a variable transmission waiting time. When the STA 10 receives a communication parameter notification including the value for deciding the variation range, the control unit 17 sets the variable transmission waiting lime duration using the value for deciding the variation range.

More specifically, the value for deciding the variation range, that is, the communication parameter is a parameter for deciding the number of slot times in a random backoff time. For example, the communication parameter is a parameter for changing a distribution of a contention window (referred to as a CW (Contention Window) hereinafter) for deciding the number of slot times in the random backoff time. For example, the communication parameter may be a minimum value $CW_{min}$ of the CW.

More specifically, the control unit 17 in the STA 10 acquires $CW_{min}$ as the communication parameter from a communication parameter notification and sets a transmission waiting time duration on the basis of an SIFS or another IFS and the number of slot times decided from the acquired $CW_{min}$. Further, the control unit 17 in the AP 20 decides that the $CW_{min}$ is a value greater than a default value of $CW_{min}$ of the STA 10 when a decided transmit power value of the STA 10 is higher than the default value. When the decided transmit power value of the STA 10 is lower than the default value, it is decided that the $CW_{min}$ is a value less than the default value of $CW_{min}$ of the STA 10.

In addition, the communication parameter may be a maximum value $CW_{max}$ of the CW. In this case, the control unit 17 in the AP 20 decides that the $CW_{max}$ is a value greater than a default value of $CW_{min}$ of the STA 10 when the decided transmit power value of the STA 10 is higher than the default value. When the decided transmit power value of the STA 10 is lower than the default value, it is decided that the $CW_{max}$ is a value smaller than the default value of $CW_{max}$ of the STA 10.

Furthermore, the communication parameter may be a value for designating a form of a CW distribution (probability distribution). Here, the CW distribution in wireless LAN communication is generally a uniform distribution. In contrast, the CW distribution is changed to a different distribution. In the present modified example. For example, a distribution designated through the communication parameter may be a discrete probability distribution such as Gauss distribution, binomial distribution or Poisson distribution, or a continuous probability distribution such as Cauchy distribution, exponential distribution, Rayleigh distribution, chi-square distribution, gamma distribution, beta distribution, Laplace distribution, logistic distribution or Weibull distribution.

In this case, the control unit 17 in the AP 20 decides that the CW distribution is a distribution having a greater average probability distribution than a uniform distribution when the decided transmit power value of the STA 10 is higher than the default value. When the decided transmit power value of the STA 10 is lower than the default value, it is decided that the CW distribution is a distribution having a smaller average probability distribution than the uniform distribution.

As a result, according to the first modified example of the present embodiment, the communication parameter is a variable transmission waiting time duration. Accordingly, it is possible to set a transmission waiting time duration in accordance with existing standards without setting a new fixed transmission waiting time duration, and to realize equalization of communication efficiencies of a plurality of communication apparatuses while securing versatility.

Furthermore, the communication parameter is a parameter for changing a distribution of a contention window related to a variable transmission waiting time duration. Accordingly; it is possible to suppress generation of harmful effects due to as abrupt transmission waiting time duration change by gradually varying the variable transmission waiting time duration.

Second Modified Example

As a second modified example of the present embodiment, the communication parameter may be a second parameter, which is a parameter for deciding an upper limit of the quantity of transmitted data. Specifically, the communication parameter is information indicating an upper limit of the quantity of data that can be transmitted at one time (referred to as data quantity upper limit information hereinafter), and the control unit 17 sets a value indicated by the data quantity upper limit information as an upper limit of the quantity of data that can be transmitted at one time in the communication apparatus when a communication parameter notification including the data quantify upper limit information is received. For example, the data quantity upper limit information includes information indicating an upper limn of a byte length of the data that can be transmitted in accordance with aggregation (referred to as art upper limit byte length hereinafter).

More specifically, the control unit 17 in the STA 10 sets an upper limit byte length included in the communication parameter notification as an upper limit of aggregation when the communication parameter notification is received. Then, the data processing unit 11 connects frames within a range in which the quantity of data does not exceed the byte length and the communication unit 12 transmits an aggregation frame acquired through the connection. Meanwhile, a default value of the upper limit of a byte length of data which can be transmitted in accordance with aggregation is defined in wireless LAN communication specifications, and for example, the default value may be set as an initial value.

Here, as the upper limit byte length decreases, the quantity of data that can be transmitted at one time decreases and thus the number of times of transmission increases. That is, the number of times the STA 10 must acquire a transmission right increases. For example, when data, which cast be transmitted once in the case of an upper limn byte length corresponding to the default value, is divided and transmitted twice because the upper limit byte length is less than the default value, a transmission opportunity for transmitting the same quantity of data diminishes. More specifically, when a probability that a transmission right is acquired is a (a<1), a probability that data transmission is completed is a if the quantity of data is less than or equal to the upper limit byte length. Conversely, when the quantity of data exceeds the upper limit byte length and is less than or equal to twice the upper limit byte length, a probability that data transmission is completed is $a^2$, and thus a probability that the same quantity of data is continuously transmitted decreases.

Accordingly, in the present modified example, the control unit 17 in the AP 20 decides that the upper limit byte length is a value less than the default value of the upper limit byte length of the STA 10 when a decided transmit power value of the STA 10 is higher than the default value. Further, when the decided transmit power value of the STA 10 is lower than the default value, it is decided that the upper limit byte length is a value greater than the default value of the upper limit byte length of the STA 10.

Meanwhile, although an example in which the data quantity upper limit information is the upper limit of the by the length of data that can be transmitted in accordance with aggregation has been described, the data quantity upper limit information may be an upper limit of the quantity of data in a frame wiser; aggregation is not used. Furthermore, the data quantity upper limit information may be information indicating a range of acquirable values of a data quantity in addition to a value indicating the upper limit.

As a result according to the second modified example of the present embodiment, the communication parameter includes the second parameter for deciding the upper limit of the quantity of transmitted data, and the control unit 17 sets a frame length on the basis of the second parameter. Accordingly, it is possible to realize equalization of communication efficiencies of a plurality of communication apparatuses while securing versatility by controlling a transmission opportunity using an existing communication parameter.

Third Modified Example

As a third modified example of the present embodiment, the communication parameter may be a third parameter, which is a parameter for deciding an upper limit of a frame transmission period length. Specifically, the communication parameter is Information indicating, an upper limit of a length of a period in which a frame can be transmitted (referred to as transmission period length upper limit information hereinafter), and the control unit 17 sets a value indicated by the transmission period length upper limit information as an upper limit of a transmission period length of the communication apparatus when a communication parameter notification including the transmission period length upper limit information is received. For example, the transmission period length upper limit information includes information indicating a transmission opportunity (TXOP) limit.

More specifically, the control unit 17 in the STA 10 sets a TXOP limit included in a communication parameter notification as a TXOP limit of the communication apparatus when the communication parameter notification is received. Then, the data processing unit 11 generates a frame having a transmission period length that does not exceed the set TXOP limit, and the communication unit 12 transmits the generated frame. Meanwhile, a plurality of frames may be generated and transmitted within a range that does not exceed the set TXOP limit. Further, a default value is set for each frame access category with respect to the TXOP limit.

Here, as the TXOP limit decreases, the transmission period length decreases and thus the number of times of transmission increases. That is, the number of times the STA 10 must acquire a transmission right increases and a transmission opportunity tor transmitting the same quantity of data diminishes as described in the second modified example.

Accordingly, in the present modified example, the control unit 17 in the AP 20 decides that the TXOP limit is a value less than a default value of a TXOP limit of the STA 10 when a decided transmit power value of the STA 10 is higher than the default value. Further, it is decided that the TXOP limit is a value greater than the default value of the TXOP limit of the STA 10 when the decided transmit power value of the STA 10 is lower than the default value.

Meanwhile, although an example in which the transmission period length upper limit information is the upper limit of the length of a period in which a frame can be transmitted has been described, the transmission period length upper limit information may be information indicating a range of acquirable values of the length of a period in which a frame can be transmitted in addition to a value indicating the upper limit.

As a result, according to the third modified example of the present embodiment, the communication parameter includes the third parameter for deciding the upper limit of the frame transmission period length and the control unit 17 sets the frame transmission period length on the basis of the third parameter. Accordingly, it is possible to realize equalization of communication efficiencies of a plurality of communication apparatuses while securing versatility by controlling a transmission opportunity using an existing communication parameter.

Fourth Modified Example

As a fourth modified example of the present embodiment, the communication parameter may be a fourth parameter, which is parameter for deciding an upper limit of the number of times a frame is retransmitted. Specifically the communication parameter is information indicating the upper limit of the number of times a frame is retransmitted (referred to as retransmission number upper limit information hereinafter) and the control unit 17 sets a value indicated by the retransmission number upper limit information as an upper limit of the number of times a frame is retransmitted in the communication apparatus when a communication parameter notification including the retransmission number upper limit information is received.

For example, the control unit 17 in the STA 10 sets a value indicated by the retransmission number upper limit information included in the communication parameter notification as the upper limit of the number of times a frame is retransmitted in the communication apparatus when the communication parameter notification is received. In addition, the control unit 17 causes the communication unit 12 to retransmit a frame within a range that does not exceed the upper limit of the number of times of retransmission when it is determined that frame transmission fails.

Here, as the upper limit of the number of times a frame is retransmitted decreases, the number of times the same frame is transmitted decreases and thus a frame transmission success probability is reduced.

Accordingly, in the present modified example, the control unit 17 in the AP 20 decides that the upper limit of the number of times of retransmission is a value less than a default value of the upper limit of the number of times of retransmission of the STA 10 when a decided transmit power value of the STA 10 is higher than a default value. Further, it is decided that the upper limit of the number of times of retransmission is a value creates than the default value of the upper limit of the number of times of retransmission of the STA 10 when the decided transmit power value of the STA 10 is lower than the default value.

As a result, according to the fourth modified example of the present embodiment, the communication parameter includes the fourth parameter for deciding the upper limit of the number of times a frame is retransmitted and the control unit 17 sets the number of times a frame is retransmitted on the basis of the fourth parameter. Accordingly, it is possible to realize equalization of communication efficiencies of a plurality of communication apparatuses while securing versatility by controlling a transmission success probability using an existing communication parameter.

Fifth Modified Example

As a fifth modified example of the present embodiment, the communication parameter may be a fifth parameter, which is a parameter for deciding a frame transmission frequency. Specifically, the communication parameter is information indicating an available frequency (referred to as frequency information hereinafter) and the control unit 17 causes the communication unit 12 to transmit frames using a frequency indicated by the frequency information when a communication parameter request including the frequency information is received. For example, the frequency information may be information indicating fee number of unit channels that can be used at one time. Meanwhile, a unit channel refers to a minimum frequency bandwidth for transmitting frames in wireless LAN communication.

More specifically, the control unit 17 in the STA 10 sets the number of unit channels that can be used at one time, included in a communication parameter notification, as an upper limit of the number of unit channels that can be used in the communication apparatus when the communication parameter notification is received. Then, the data processing unit 11 generates frames that, can be transmitted within a range of the set number of unit channels, and the communication unit 12 transmits the generated frames for each channel. Meanwhile, a default value may be provided with respect to the number of available unit channels.

In addition, the control unit 17 in the AP 20 decides that the number of unit channels is a value less than a default value of the number of unit channels of the STA 10 when a decided transmit power value of the STA 10 is higher than the default value. Further, it is decided that the number of unit channels is a value greater than the default value of the number of unit channels of the STA 10 when the decided transmit power value of the STA 10 is lower than the default value.

Furthermore, the frequency information may be information indicating, an available channel. Further, the available channel may be a channel used only by the STA 10 that performs TPC.

Here, a case in which the STA 10 that performs TPC and the STA 10 that does not perform TPC perform communication using the same channel exists. In such a case, communication efficiency of one of the STAs 10 may be relatively deteriorated.

Accordingly, the AP 20 notifies each STA 10 performing TPC of a specific channel, which is an available channel. Specifically, the AP 20 decides that a channel common tor the STAs 10 corresponding to transmission sources of communication parameter requests is the frequency information and transmits a communication parameter notification including the decided frequency information to the STAs 10. Then, each of the STA 10 sets, as a channel used therefor, an available channel indicated by the frequency information included in the received communication parameter notification. For example, the AP 20 decides that a larger number of channels for the STA 10 that performs TPC than for the STA 10 that does not perform TPC are available channels, which is the frequency information. Meanwhile, the AP 20 may decide that a predetermined channel is a dedicated channel used by the STA 10 that performs TPC.

As a result, according to the fifth modified example of the present embodiment, the communication parameter includes the fifth parameter for deciding a frame transmission frequency and the control unit 17 sets the frame transmission frequency on the basis of the fifth parameter. Accordingly, it is possible to control a transmission success probability without changing a transmission period.

In addition, the fifth, parameter includes the number of available unit channels or a channel. Accordingly, a transmission frequency cart be controlled using conventional frequency control to achieve simplification and commoditization of a process.

Sixth Modified Example

As a sixth modified example of the present embodiment, the communication parameter may be a sixth parameter, which is a parameter used to specify the presence or absence of transmit power control. Specifically, the communication parameter is information used to determine the presence or absence of TPC (referred to as determination element information hereinafter) and the control unit 17 determines the presence or absence of TPC on the basis of the determination element information when a communication parameter notification including the determination element information is received and frame transmission timing arrives. For example, the determination element information may be a transmission period attribute.

More specifically, the control unit 17 determines whether a frame transmission period is included in a period reserved as a TPC available time (referred to as a reservation period hereinafter) and decides that TPC is performed when it is determined that the transmission period is included in the reservation period.

Here, the reservation period may be a period secured in a restricted access window (RAW) defined in IEEE 802.11ah. In general, frame transmission using carrier sense multiple access (CSMA)/collision avoidance (CA) is permitted for only a specific STA 10 selected from a plurality of STAs 10 connected to the AP 20 in the RAW.

Accordingly, in the present modified example, the AP 20 decides the reservation period for the STA 10 that performs TPC. Specifically, the control unit 17 in the AP 20 decides the reservation period for a transmission source of a communication parameter request and transmits a communication parameter notification including information indicating the decided reservation period (referred to as reservation period information hereinafter) to each STA 10 corresponding to the transmission source of the communication parameter request.

In addition, the data processing unit 11 in the STA 10 acquires the reservation period information from the received communication parameter notification and stores the acquired reservation period information in the storage unit. Subsequently, the control unit 17 determines whether a frame transmission period is included in the reservation period indicated by the reservation period information stored in the storage unit when the frame transmission period arrives. When it is determined that the frame transmission period is included in the reservation period, the control unit 17 performs TPC for the communication unit 12, that is, the amplification unit 16. Meanwhile, when it is determined that the frame transmission period is not included in the reservation period, the control unit 17 does not perform TPC.

Furthermore, the determination element information may be a frame type. Specifically, the control unit 17 in the AP 20 decides a frame type permitted for transmission using TPC and transmits a communication parameter notification including information indicating the frame type (referred to as frame type information hereinafter) to each STA 10 that is a transmission source of a communication parameter request. For example a frame of the predetermined type may be at least one of a management frame defined in IEEE 802.11 and a frame in an access category of AC_VO, AC_VI, AC_BE, or AC_BK.

In addition, the data processing unit 11 in the STA 10 acquires the name type information from the received communication parameter notification and stores the acquired frame type information in the storage unit. Subsequently, when a transmission period of a frame arrives, the control unit 17 determines whether the type of frame corresponds to the type indicated by the frame type information stored in the storage unit. When it is determined that the frame types correspond to each other, the control unit 17 performs TPC for the communication unit 12, that is, the amplification unit 16. Meanwhile, when it is determined that the frame types do not correspond to each other, the control unit 17 does not perform TPC.

Figure 5:
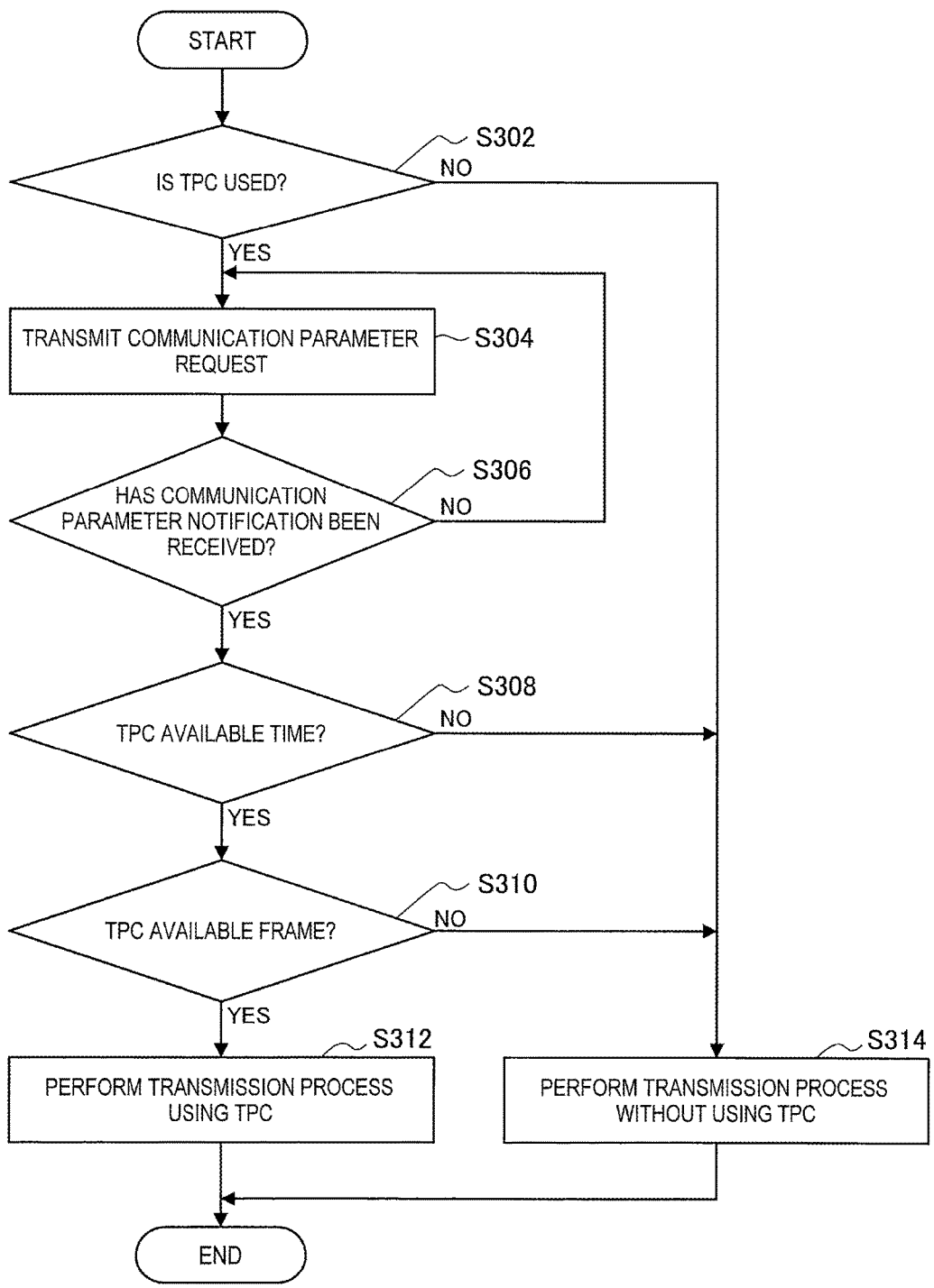
FIG. 5 is a flowchart schematically illustrating a process of an STA according to a sixth modified example of the embodiment.

Further, the presence or absence of TPC may be determined using a plurality of pieces of determination element information. Specifically, the control unit 17 determines the presence or absence of TPC on the basis of the reservation period information and the frame type information. Furthermore, a process of the present configuration will be described in detail with reference to FIG. 5. FIG. 5 is a flowchart schematically illustrating a process of the STA 10 according to the sixth modified example of the present embodiment. Meanwhile, descriptions of processes in the aforementioned embodiment and the present modified example will be omitted.

First, the STA 10 determines the presence or absence of TPC (step S302). When it is determined that TPC is performed, the STA 10 transmits a communication parameter request to the AP 20 (step S304).

Then, the STA 10 waits until a communication parameter notification is received (step S300) and, when the communication parameter notification is received and a transmission period of a frame arrives, determines whether the transmission period is a TPC available period (step S308). Specifically the control unit 17 determines whether the transmission period of the frame is included in a reservation period indicated by reservation period information included in the received communication parameter notification. Meanwhile, the communication parameter request is retransmitted after the reception of the communication parameter request until a predetermined time elapses. Further, when the communication parameter notification is not received within the predetermined time, that is, in the case of timeout, the process proceeds to step S314.

When it is determined that the transmission period of the frame is a TPC available period, the STA 10 determines whether the frame is a TPC available frame (step S310). Specifically, when it is determined that the transmission period of the frame is included in the reservation period indicated by the reservation period information, the control unit 17 determines whether the type of the frame corresponds to a type indicated by frame type information included in the received communication parameter notification.

When it is determined that the frame is a TPC available frame, the STA 10 performs a transmission process using TPC (step S312). Specifically, when it is determined that the type of frame corresponds to the type indicated by the frame type information, the control unit instructs the communication unit 12, that is, the amplification unit 16, to set transmit power and causes the communication unit to transmit the frame with the set transmit power.

Meanwhile, when it is determined that TPC is not performed in step S302, when it is determined that the transmission period is not a TPC available period in step S308, and when it is determined that the frame is not a TPC available frame in step S310, the STA 10 perform a transmission process without using TPC (step S314).

As a result, according to the sixth modified example of the present embodiment, the communication parameter includes the sixth parameter used to determine the presence or absence of transmit power control and the control unit 17 decides the presence or absence of transmit power control on the basis of the sixth parameter. Accordingly, frame transmission using TPC is suppressed and thus a transmission success probability difference between the STA 10 that performs TPC and the STA 10 that does not perform TPC can be further reduced.

Furthermore, the sixth parameter includes a transmission period attribute or a frame type. Accordingly, an existing scheme can be used to determine presence or absence of TPC to suppress complication of the STA 10 and cost increase due to addition of a process of the present modified example.

Seventh Modified Example

Figure 6:
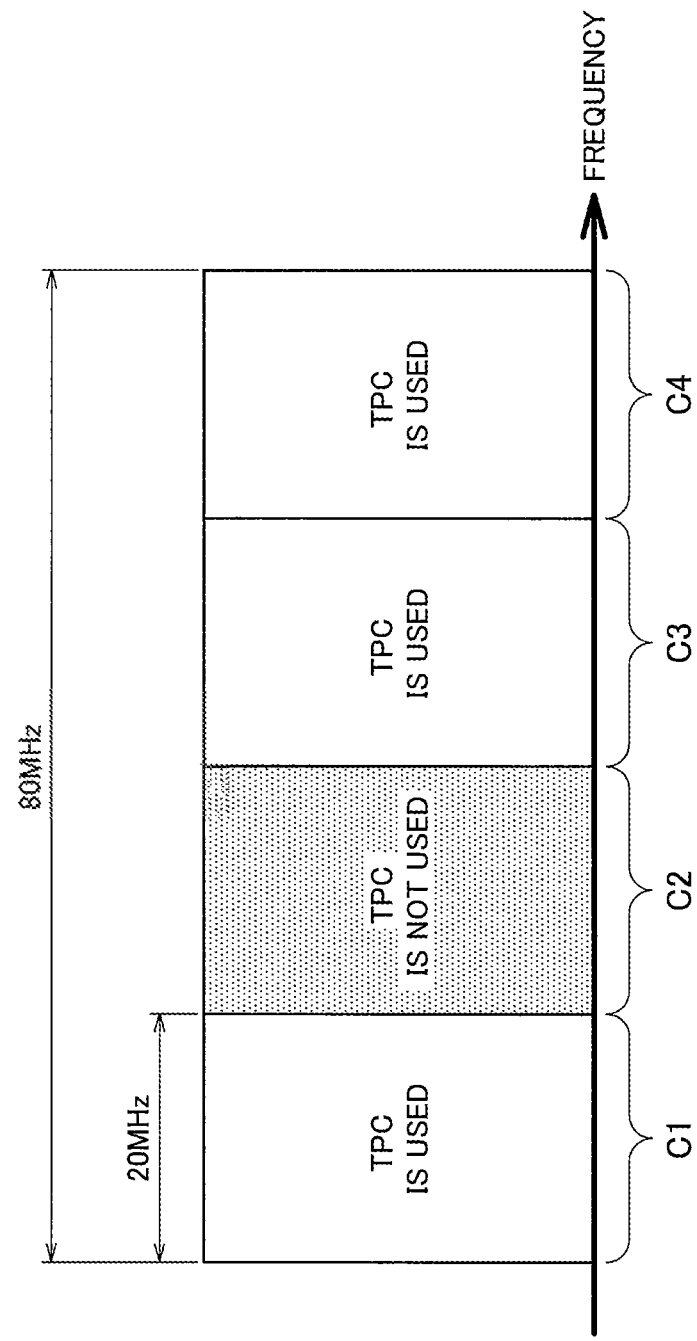
FIG. 6 is a diagram illustrating an example of channels used by an STA according to a seventh modified example of the embodiment.

As a seventh modified example of the present embodiment, the STA 10 may perform a process related to TPC for each channel. Specifically, the control unit 17 in the STA 10 performs a determination of the presence or absence of TPC, a transmission of a communication parameter request, a setting of transmission resources based on a communication parameter, and the like for each unit channel. Further, the present modified example will be described in detail with reference to FIG. 6. FIG. 6 illustrates an example of channels used by the STA 10 according to the seventh modified example of the present embodiment.

The STA 10 performs communication with the AP 20 using a plurality of unit channels. For example, a channel used by the STA 10 for communication may be an 80 MHz channel including four unit channels having a bandwidth of 20 MHz, as illustrated in FIG. 6. Meanwhile, a purpose of the communication may be determined for each of the unit channels. For example, a unit channel C4 is used for data communication.

First, the control unit 17 of the STA 10 determines the presence or absence of TPC for each of the unit channels. For example, the control unit 17 determines the presence or absence of TPC for each of unit channels C1 to C4 and performs a process related to TPC only for the unit channels C1, C3, and C4 for which it is determined that TPC is performed.

Figure 7:
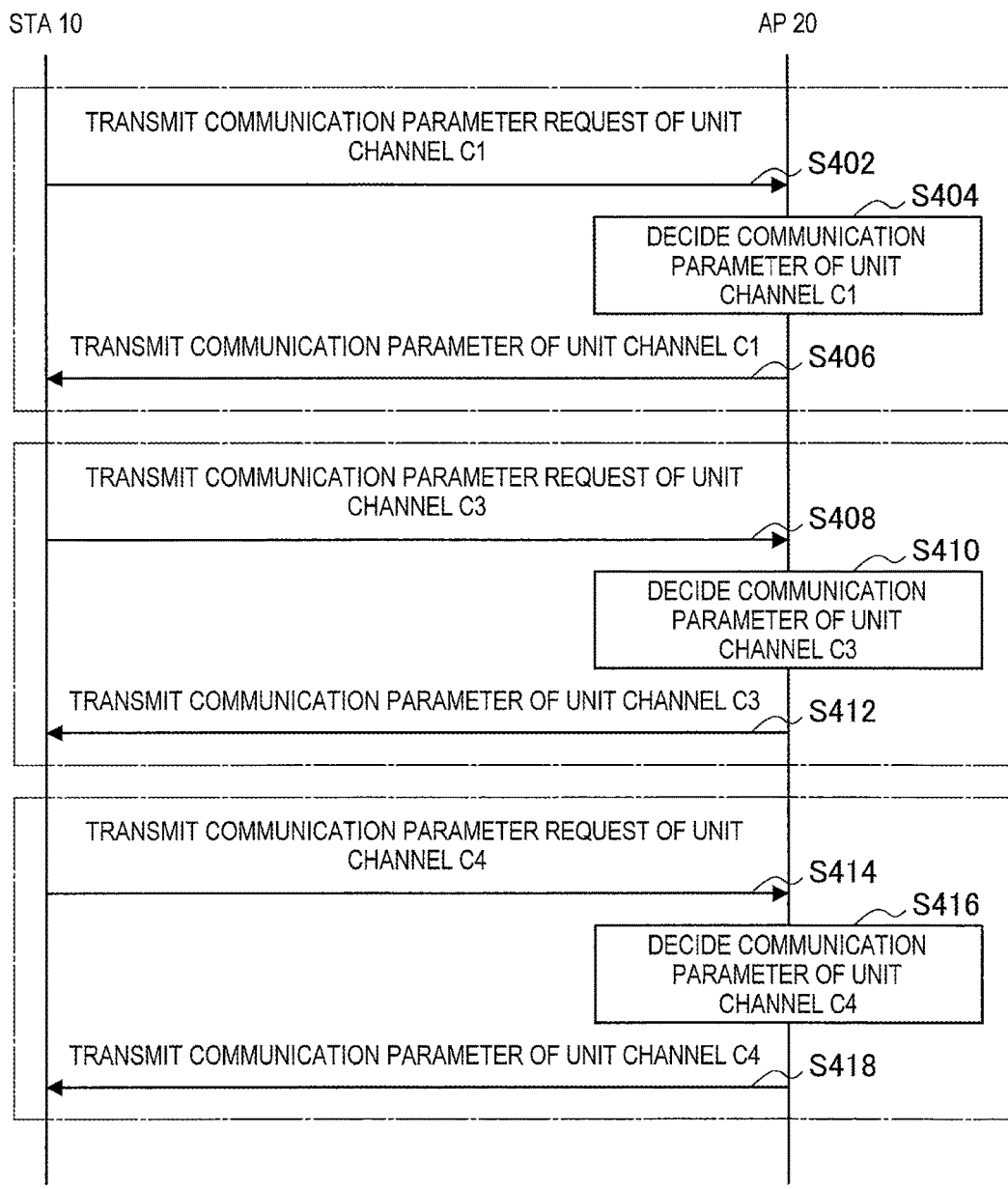
FIG. 7 is a sequence diagram schematically illustrating a process of the STA and an AP according to the seventh modified example of the embodiment.

Next, the process related to TPC will be described in detail with reference to FIG. 7. FIG. 7 is a sequence diagram schematically illustrating a process of the STA 10 and the AP 20 according to the seventh modified example of the present embodiment. Meanwhile, description of substantially the same process will be omitted.

The STA 10 transmits a communication parameter request to the AP 20 over the unit channel C1 (step S402). Specifically the control unit 17 causes the data processing unit 11 to generate the communication parameter request and causes the communication unit 12 to transmit the communication parameter request over the unit channel C1.

When the communication parameter request is received, the AP 20 decides a communication parameter of the unit channel C1 (step S404). Specifically, the control unit 17 decides the communication parameter on the basis of signal power information related to the STA 10.

Subsequently, the AP 20 transmits a communication parameter notification to the STA 10 over the unit channel C1 (step S406). Specifically, the control unit 17 causes the data processing unit 11 to generate a communication parameter notification including information indicating the decided communication parameter and causes the communication unit 12 to transmit the generated communication parameter notification.

Then, the STA to transmits a communication parameter request to the AP 20 over the unit channel C3 (step S408). Specifically, the control unit 17 causes the data processing unit 11 to generate the communication parameter request and causes the communication unit 12 to transmit the communication parameter request over the unit channel C1 in a similar manner as the process of the unit channel C1.

When the communication parameter request is received, the AP 20 decides a communication parameter of the unit channel C3 (step S410) and transmits the communication parameter notification of the unit channel C3 to the STA 10 (step S412).

In steps S414 to S418, substantially tire same processes as the unit channels C1 and C3 are performed for the unit channel C4 and thus descriptions thereof will be omitted.

Meanwhile, although an example in which a communication parameter request is transmitted over a unit channel having the same communication parameter request, for example, the unit channel C1, has been described, a communication parameter request may be transmitted over each unit channel related to the communication parameter request. For example, a communication parameter request related to the unit channel C3 may be transmitted over the unit channel C3.

In addition, although an example in which a communication parameter request is transmitted for each unit channel has been described, communication parameter requests may be combined and transmitted. For example, communication parameter requests related to the unit channels C1, C3, and 04 may be combined into one or two communication parameter requests and the combined communication parameter requests may be transmitted.

Furthermore, although an example in which a communication parameter is decided for each unit channel has been described, a communication parameter may be commonly decided for some of a plurality of unit channels. For example, a communication parameter common for the unit channels C1 and may be decided.

Further, when some of the plurality of unit channels are in a busy state, only a unit channel that is not in the busy state that is, a unit channel in the idle state may be used for transmission.

As a result, according to the seventh modified example, the STA 10 pet forms a process related to TPC for each channel. Accordingly, an influence on the STA 10 that does not perform TPC can be reduced and equalization of communication efficiencies can be enhanced in comparison to a case in which transmission using TPC is performed over a single channel.

Eighth Modified Example

As an eighth modified example of the present embodiment, the STA 10 may acquire a communication parameter through other methods. Specifically, the communication parameter is included in a beacon frame transmitted from the AP 20 and the STA 10 acquires the communication parameter from the received beacon frame. For example, the AP 20 calculates transmit power on the basis of an SN ratio and the like of radio waves received from the STA in and decides a communication parameter depending on the calculated transmit power. Then, the AP 20 transmits a beacon frame including the communication parameter. Meanwhile, the beacon frame may include the aforementioned signal power information, and the STA 10 may calculate transmit power from received signal strength of the beacon.

Figure 8:
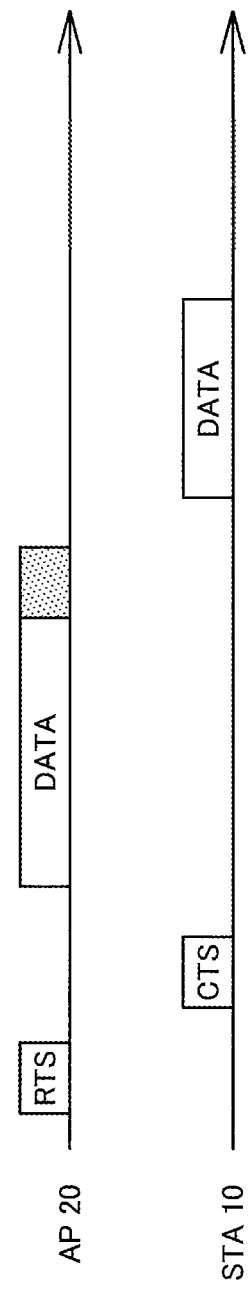
[FIG. 8]

Furthermore, a communication parameter may be included in a data frame transmitted from the AP 20, and the STA 10 may acquire the communication parameter from the received data frame. Further, a data frame including a communication parameter will be described in detail with reference to FIG. 8. FIG. 8 is a diagram illustrating an example of a frame exchange sequence in the eighth modified example of the present embodiment.

As illustrated in FIG. 8, the AP 20 transmits an RTS frame to the STA 10, receives a CTS frame from the STA 10 and then transmits a data frame. Here, the transmitted data frame includes information indicating a communication parameter, which is indicated as a gray part in FIG. 8. Meanwhile, the data frame may include signal power information in addition to the information indicating the communication parameter.

Then, when the data frame including the communication parameter and the like is received from the AP 20, the STA 10 performs setting of transmission resources, and the like in accordance with the communication parameter and transmits a data frame. Meanwhile, the STA 10 may immediately transmit a frame corresponding to a response after the data frame is received or transmit a frame in accordance with a general random access procedure, in addition, as illustrated in FIG. 8, a series of sequence periods may be designated as a transmission period in an RTS CTS frame exchange sequence and transmission of other communication apparatuses may be suppressed. For example, the designated transmission period may be set as a network allocation vector (NAV).

Meanwhile, although not shown in FIG. 8, ACK for the data frame and ACK for RTS/CTS may be transmitted.

As a result, according to the eighth modified example of the present embodiment, a communication parameter is included in a frame spontaneously transmitted from the AP 20. Accordingly, communication to request, a communication parameter from the STA 10 can be omitted and thus traffic can be decreased and power of the STA 10 can be reduced.

3. Application Example

The technology according to the embodiments of the disclosure can be applied to various products. For example, the STA 10 may be realized as mobile terminals such as smartphones, tablet PCs (Personal Computers), notebook PCs, portable game terminals, or digital cameras, fixed-type terminals such as television receivers, printers, digital scanners, or network storages, or car-mounted terminals such as car navigation devices. In addition, the STA 10 may be realized as terminals that perform M2M (Machine to Machine) communication (also referred to as MTC (Machine Type Communication) terminals) such as smart meters, vending machines, remotely controlled surveillance devices, or POS (Point Of Sale) terminals. Furthermore, the STA 10 may be wireless communication modules mounted in such terminals (for example, integrated circuit modules configured by one die).

On the other hand, for example, the AP 20 may be realized as a wireless LAN access point (also referred to as a wireless base station) which has a router function or does not have a router function. The AP 20 may be realized as a mobile wireless LAN router. The AP 20 may also be a wireless communication module (for example, an integrated circuit module configured with one die) mounted on the device.

3-1. First Application Example

Figure 9:
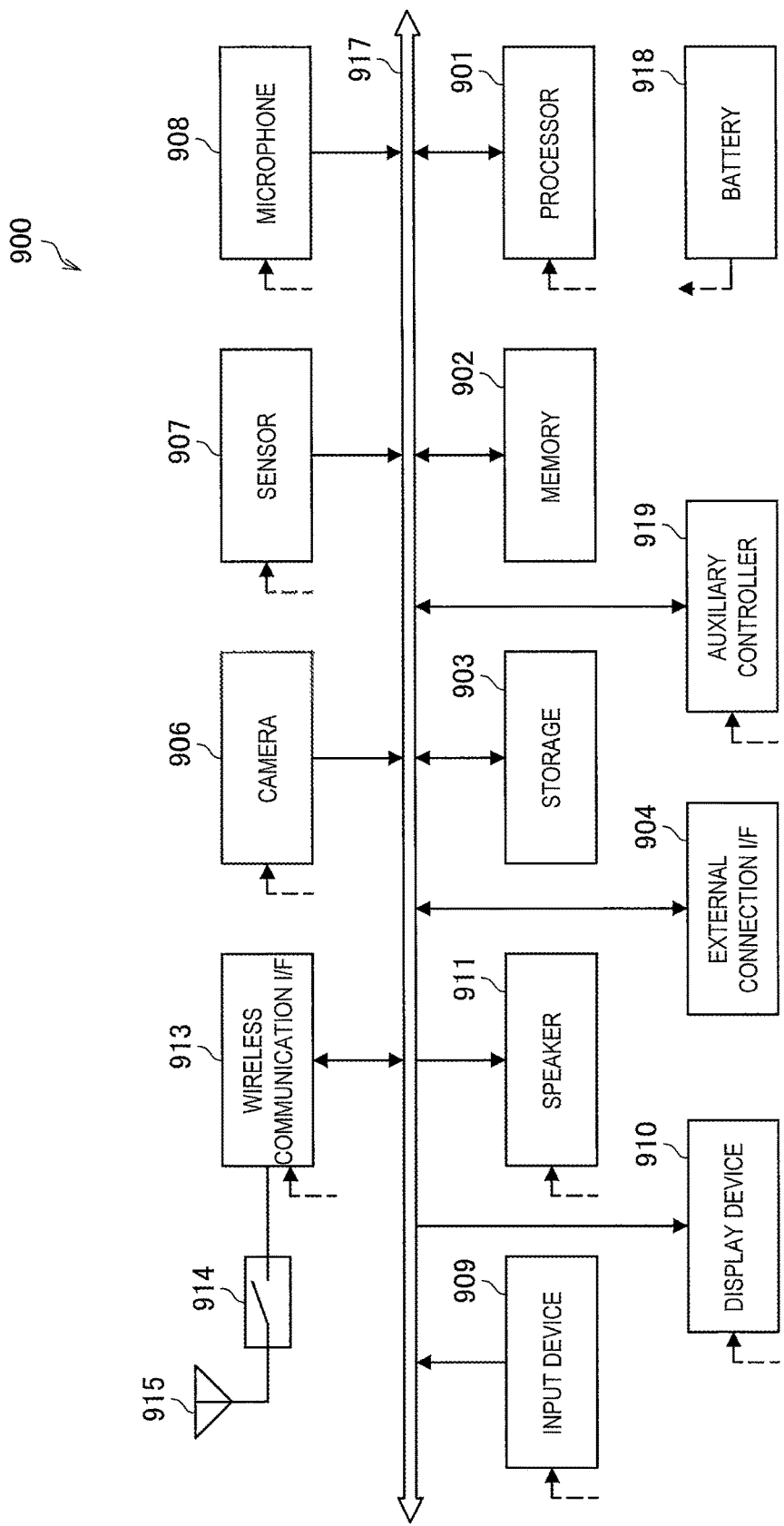
FIG. 9 is a block diagram showing an example schematic configuration of a smartphone.

FIG. 9 is a block diagram showing an example of a schematic configuration of a smartphone 900 to which the technology of the present disclosure can be applied. The smartphone 900 includes a processor 901, a memory 902, a storage 903, an external connection interface 904, a camera 906, a sensor 907, a microphone 908, a input device 909, a display device 910, a speaker 911, a wireless communication interface 913, an antenna switch 914, an antenna 915, a bus 917, a battery 918, and an auxiliary controller 919.

The processor 901 may be, for example, a CPU (Central Processing Unit) or an SoC (System on Chip), and controls functions of an application layer and other layers of the smartphone 900, The memory 902 includes a RAM (Random Access Memory) and a ROM (Read Only Memory), and stores programs executed by the processor 901 and data. The storage 903 can include a storage medium such as a semiconductor memory or a hard disk. The external connection interface 904 is an interface for connecting an externally attached device such as a memory card or a USB (Universal Serial Bus) device to the smartphone 900.

The camera 906 has an image sensor, for example, a CCD (Charge Coupled Device) or a CMOS (Complementary Metal Oxide Semiconductor), to generate captured images. The sensor 907 can include a sensor group including, for example, a positioning sensor, a gyro sensor a geomagnetic sensor, an acceleration sensor, and the like. The microphone 908 converts sounds input to the smartphone 900 into audio signals. The input device 909 includes, for example, a touch sensor that detects touches on a screen of the display device 910, a key pad, a keyboard, buttons, switches, and the like, to receive manipulations or information inputs from a user, the display device 910 has a screen such as a liquid crystal display (LCD) or an organic light emitting diode (OLED) display 10 display output images of the smartphone 900. The speaker 911 converts audio signals output from the smartphone 900 into sounds.

The wireless communication interface 913 supports one or more wireless LAN standards of IEEE 802.11a, 11b, 11g, 11n, 11ac, 11ad, and 11ah to execute the wireless LAN communication. The wireless communication interface 913 can communicate with another device via a wireless LAN access point in an infrastructure mode. In addition, the wireless communication interface 913 can directly communicate with another device in a direct communication mode such as an ad hoc mode or Wi-Fi Direct (registered trademark). Wi-Fi Direct is different from the ad hoc mode, and thus one of two terminals operates as an access point. However, communication is performed directly between the terminals. The wireless communication interface 913 can typically include a baseband processor, an RP (Radio Frequency) circuit, a power amplifier, and the like. The wireless communication interface 913 may be a single-chip module on which a memory that stores a communication control program, a processor that executes the program, and a relevant circuit are integrated. The wireless communication interface 913 may support another kind of wireless communication scheme such as a cellular communication scheme, a short-range wireless communication scheme, or a proximity wireless communication scheme in addition to the wireless LAN scheme. The antenna switch 914 switches a connection destination of the antenna 915 for a plurality of circuits (for example, circuits for different wireless communication schemes) included in the wireless communication interface 913. The antenna 915 has a single or a plurality of antenna elements (for example, a plurality of antenna elements constituting a MIMO antenna), and is used for transmission and reception of wireless signals from the wireless communication interface 913.

Note that the smartphone 900 may include a plurality of antennas (for example, antennas for a wireless LAN or antennas for a proximity wireless communication scheme, or the like), without being limited to the example of FIG. 9. In this case, the antenna switch 914 may be omitted from the configuration of the smartphone 900.

The bus 917 connects the processor 901, the memory 902, the storage 903, the external connection interface 904, the camera 906, the sensor 907, the microphone 908, the input device 909, the display device the speaker 911, the wireless communication interface 913, and the auxiliary controller 919 to one another. The battery 918 supplies electric power to each of the blocks of the smartphone 999 shown in FIG. 9 via power supply lines partially indicated by dashed hues in the drawing. The auxiliary controller 959 causes, for example, necessary minimum functions of the smartphone 900 to be operated in a sleep mode.

In the smartphone 900 shown in FIG. 9, the data processing unit 11, the communication unit 12, and the control unit 17 described with reference to FIG. 2 may be mounted in the wireless communication interface 913. At least some of the functions may be mounted on the processor 901 or the auxiliary controller 919. Fat example, the control unit 17 performs setting related to transmission resources on the basis of information related to a received communication parameter; and the communication unit 12 performs frame transmission on the basis of the setting, and thus communication efficiencies of the smartphone 900 and other communication terminals can be equalized.

Note that the smartphone 900 may operate as a wireless access point (software AP) as the processor 901 executes the function of an access point at an application level. In addition, the wireless communication interface 913 may have the function of a wireless access point.

3-2. Second Application Example

Figure 10:
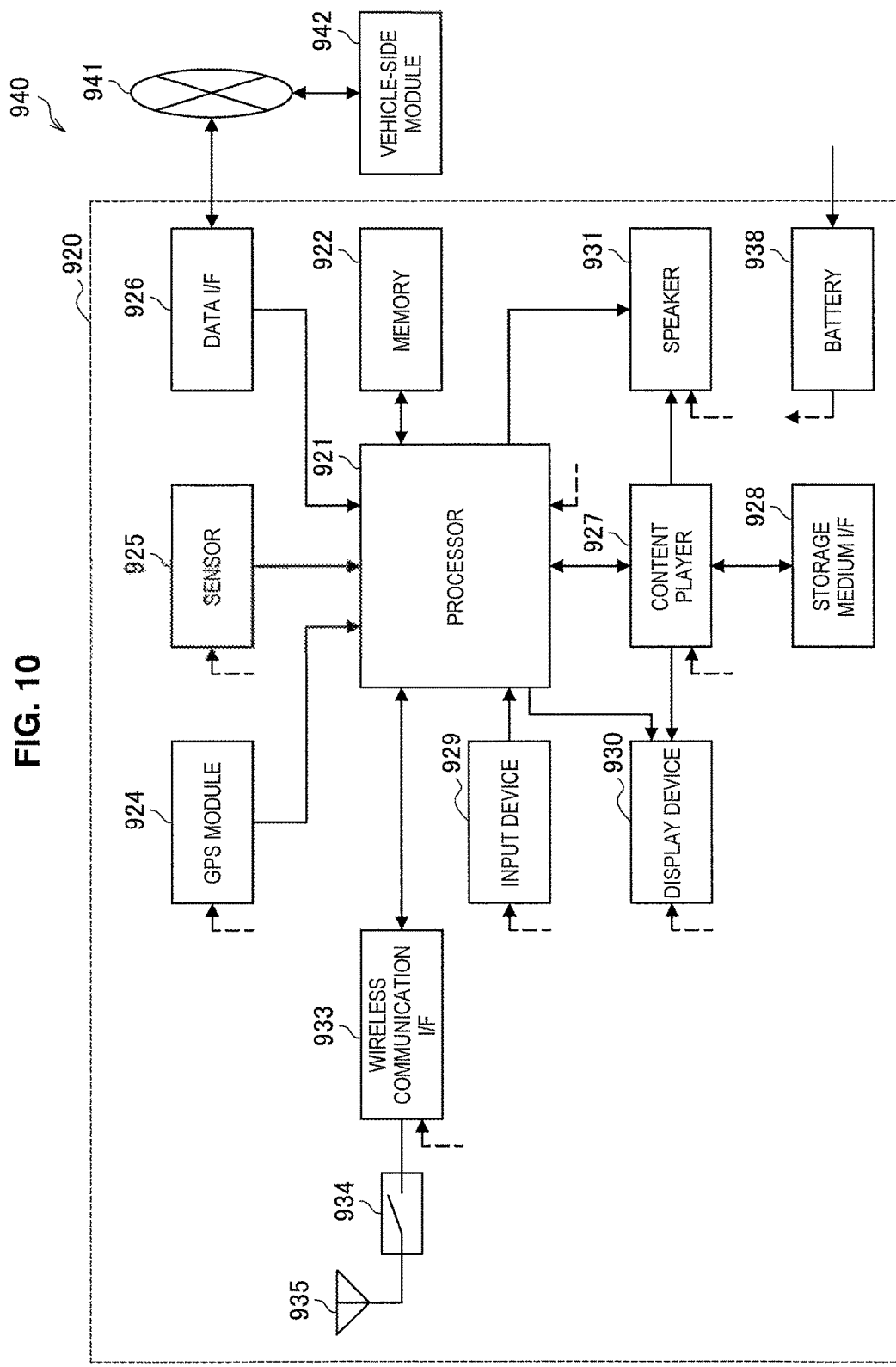
FIG. 10 is a block diagram showing an example schematic configuration of a car navigation device.

FIG. 10 is a block diagram showing an example of a schematic configuration of a car navigation device 920 to which the technology of the present disclosure can be applied. The car navigation device 920 includes a processor 921, a memory 922, a GPS (Global Positioning System) module 924, a sensor 925, a data interface 926, a content player 927, a storage medium interface 928, an input device 929, a display device 930, a speaker 931, a wireless communication interface 933, an antenna switch 934, an antenna 935, and a battery 938.

The processor 921 may be, for example, a CPU or an SoC controlling a navigation function and other functions of the car navigation device 920: The memory 922 includes a RAM and a ROM storing programs executed by the processor 921 and data.

The GPS module 924 measures a position of the ear navigation device 920 (for example, latitude, longitude, and altitude) using GPS signals received from a GPS satellite. The sensor 925 cart include a sensor group including for example, a gyro sensor, a geomagnetic sensor, a pneumatic sensor, and the like. The data interface is connected to a car-mounted network 941 via, for example, a terminal that is not illustrated to acquire data generated on the vehicle side such as car speed data.

The content player 927 reproduces content stored in a storage medium (for example, a CD or a DVD) inserted into the storage medium interface. The input device 929 includes, for example, a touch sensor that detects touches on a screen of the display device 930, buttons, switches, and the like to receive manipulations or information inputs from a user. The display device 930 has a screen such as an LCD or an OLED display to display images of the navigation function or reproduced content. The speaker 931 outputs sounds of the navigation function or reproduced content.

The wireless communication interface 933 supports one or more wireless LAN standards of IEEE 802.11a, 11b, 11g, 11n, 11ac, 11ad, and 11ah to execute wireless LAN communication. The wireless communication interface 933 can communicate with another device via a wireless LAN access point in the infrastructure mode. In addition, the wireless communication interface 933 can directly communicate with another device in a direct communication mode such as an ad hoc mode or Wi-Fi Direct. The wireless communication interface 933 can typically have a baseband processor, an RF circuit, a power amplifier, and the like. The wireless communication interface 933 may be a single-chip module on which a memory that stores a communication control program, a processor that executes the program, and a relevant circuit are integrated. The wireless communication interface 933 may support another kind of wireless communication scheme such as a short-range wireless communication scheme, a proximity wireless communication scheme, or the cellular communication scheme in addition to the wireless LAN scheme. The antenna switch 934 switches a connection destination of the antenna 935 for a plurality of circuits included in the wireless communication interface 933. The antenna 935 has a single or a plurality of antenna elements and is used for transmission and reception of wireless signals from the wireless communication interface 933.

Figure 11:
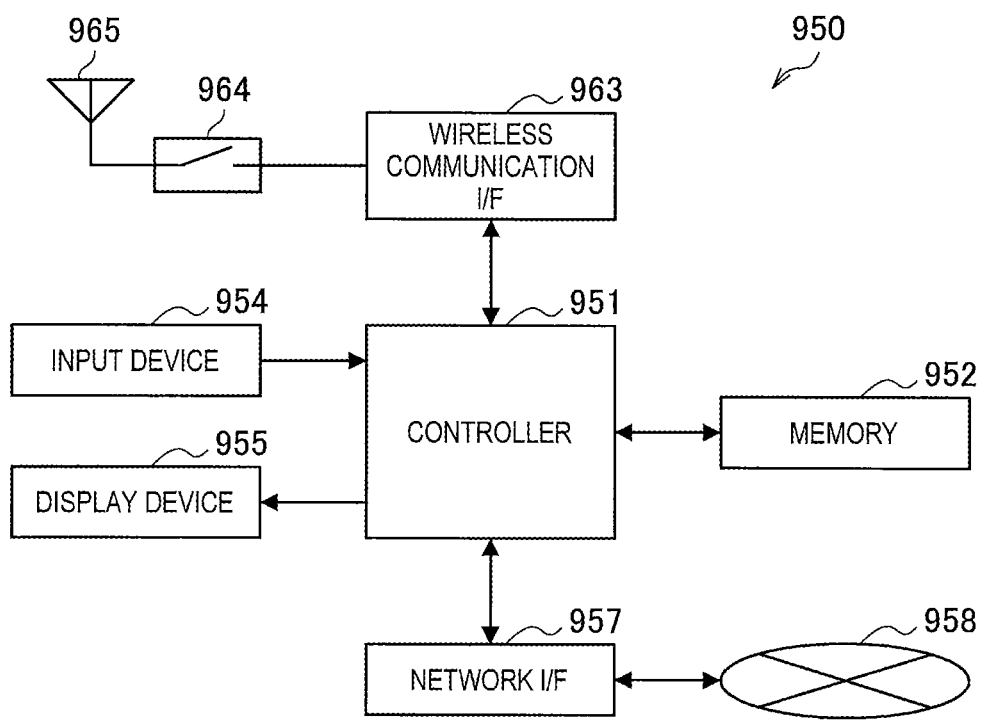
FIG. 11 is a block diagram showing an example schematic configuration of a wireless access point.

Note that the car run nation device 920 may include a plurality of antennas, without being limited to the example of FIG. 11. In this case, the antenna switch 934 may be omitted from the configuration of the car navigation device 920.

The battery 938 supplies electric power to each of the blocks of the car navigation device 920 shown in FIG. 11 via power supply lines partially indicated by dashed lines in the drawing. In addition, the battery 938 accumulates electric power supplied from the vehicle.

In the car navigation device 920 shown in FIG. 11, the data processing unit 11, the communication unit 12, and the control unit 17 described with reference to FIG. 2 may be mounted in the wireless communication interface 933. At least some of the functions may be mounted on the processor 921, For example, the control unit 17 performs setting related to transmission resources on the basis of information related, to a received communication parameter, and the communication unit 12 performs frame transmission, on the basis of the setting, and thus communication efficiencies of the car navigation device 920 and other communication terminals can be equalized.

The wireless communication interface 933 may operate as the above-described AP 20 to supply wireless connection to a terminal owned by a user boarding a vehicle. Here, for example, it is possible to provide a communication parameter to the terminal owned by the user and equalize communication efficiencies of terminals.

The technology of the present disclosure may be realized as an in-vehicle system (or a vehicle) 940 including one or more blocks of the above-described car navigation device 920, an in-vehicle network 941, and a vehicle-side module 942. The vehicle-side module 942 generates vehicle-side data such as a vehicle speed, the number of engine relations, or failure information and outputs the generated data to the in-vehicle network 941.

3.3 Third Application Example

FIG. 11 is a block diagram showing an example of a schematic configuration of a wireless access point 950 to which the technology of the present disclosure can be applied. The wireless access point 950 includes a controller 951, a memory 952, an input device 954, a display device 955, a network interface 957, a wireless communication interface 963, an antenna switch 964, and an antenna 965.

The controller 951 may be, for example, a CPU or a digital signal processor (DSP) and operates various functions (for example, access limitation routing encryption, a fire wall, and log management) of the internet Protocol (IP) laser and higher layers of the wireless access point 950. The memory 952 includes a RAM and a ROM and stores a program executed by the controller 951 and various kinds of control data (for example, a terminal list, a routing table, an encryption key security settings, and a log).

The input device 954 includes, for example, a button or a switch, and receives a manipulation from a user. The display device 955 includes an LED lamp and displays an operation status of the wireless access point 950.

The network interface 957 is a wired communication interface that connects the wireless access point 950 to a wired communication network 958. The network interface 957 may include a plurality of connection terminals. The wired communication network 958 may be a LAN such as Ethernet (registered trademark) or may be a Wide Area Network (WAN).

The wireless communication interface 903 supports one or more wireless LAN standards of IEEE 802.11a, 11b, 11g, 11n, 11ac, 11ad, and 11ah to supply wireless connection to a nearby terminal as an access point. The wireless communication interface 963 can typically include a baseband processor, an RF circuit, and a power amplifier. The wireless communication interface 963 may be a one-chip module in which a memory storing a communication control program, a processor executing the program, and relevant circuits are integrated. The antenna switch 964 switches a connection destination of the antenna 905 among a plurality of circuits included in the wireless communication interface. The antenna 965 includes one antenna element or a plurality of antenna elements and is used to transmit and receive a wireless signal through the wireless communication interface 963.

In the wireless access point 950 shown in FIG. 11, the data processing unit 11, the communication unit 12, and the control unit 17 described with reference to FIG. 2 may be mounted on the wireless communication interface 963. At least some of the functions may be mounted on the processor 951. For example, the control unit 17 performs setting related to transmission resources on the basis of information related to a received communication parameter, and the communication unit 12 performs frame transmission on the basis of the setting, and thus communication efficiencies of the wireless access point 950 and other communication terminals can be equalized.

4. Conclusion

According to an embodiment of the present disclosure, frames are transmitted with transmission resources depending on signal power information correlated to a transmission success probability, and thus a transmission success probability difference between STAs 10 is reduced. As a result, it is possible to equalize communication efficiencies of a plurality of communication apparatuses while maintaining or improving overall communication efficiency of a communication system composed of the plurality of STAs.

The preferred embodiment(s) of the present disclosure has/have been described above with reference to the accompanying drawings, whilst the present disclosure is not limited to the above examples, A person skilled in the art may find various alterations and modifications within the scope of the appended claims, and it should be understood that they will naturally come under the technical scope of the present disclosure.

For example, although a communication parameter is decided in the AP 20 in the above-described embodiment, the present technology is not limited to such an example. For example, the communication parameter may be decided in the STA 10. For example, the AP 20 transmits a communication parameter notification including a list of communication parameters and signal power information to the STA 10 when a communication parameter request is received. The STA 10 decides transmit power on the basis of the signal power information included in the communication parameter notification and decides a communication parameter on the basis of the decided transmit power value and the list of communication parameters when the communication parameter notification is received.

In addition, although an example in which the STA 10 decides a communication parameter on the basis of the communication parameter list has been described in the above-described embodiment, the STA 10 may decide a communication parameter on the basis of a communication parameter calculation formula. For example, the STA 10 acquires information indicating the communication parameter calculation formula from the AP 20 and the like and decides a communication parameter using the calculation founds of the acquired information.

Furthermore, an example in which the STA 10 sets, as transmit power thereof transmit power which is signal power information received from the AP 20 has been described in the above-described embodiment, the STA 10 may set the transmit power on the basis of other pieces of signal power information received from the AP 20. Specifically the STA 10 receives, from the AP 20, a signal power information including at least one of an SN ratio of a signal related to radio waves received by the AP 20 from the STA 10 and a received signal strength related to the radio waves and decides the transmit power on the basis of the signal power information. For example, the STA 10 calculates transmit power of radio waves such that the transmit power does not become an interference source of radio waves transmitted from another STA 10 at a longer distance from the AP 20 than a distance between the STA 10 and the AP 20 while the SN ratio or the received signal strength of the radio waves received by the AP 20 from the STA 10 is maintained as a value of a degree to which radio waves can be received. Then, the STA 10 transmits frames with the calculated transmit power.

Moreover, although an example in which the AP 20 decides a transmit power value of the STA 10 and decides a communication parameter on the basis of a relationship between the decided transmit power value and a default value has been described in the above-described embodiment, the AP 20 may decide the communication parameter on the basis of an SN ratio or a received signal strength of radio waves received from the STA 10. Specifically, the AP 20 decides a communication parameter such that a transmission opportunity of the STA 10 diminishes as the SN ratio or the received signal strength of the radio waves received from the STA 10 increases. For example, an IFS is decided such that a value thereof increases as the SN ratio of the radio waves received from the STA 10 increases.

In addition, although an example in which TPC is performed on uplink has been described in the above-described embodiment, TPC may be performed on downlink.

Further, the communication parameter request described in the above-described embodiment may include information indicating transmit power set in the STA 10 and information indicating transmit power when TPC is performed. Specifically, the AP 20 that receives the communication parameter request from the STA 10 generates channel information on the basis of transmit power information set in the STA 10, which is included in the communication parameter request, and a received signal strength of radio waves received from the STA 10. Subsequently, the AP 20 estimates an SN radio or a received signal strength of radio waves which will be received from the STA 10 in the future on the basis of the channel information and information indicating the transmit power when TPC is executed, which is included in the communication parameter request. Then, the AP 20 decides a communication parameter on the basis of the estimated SN ratio or received signal strength. In this case, the accuracy of the decided communication parameter is improved and thus an appropriate transmission process is performed in the STA 10. Accordingly, it is possible to realize more desirable communication efficiency equalization.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

A communication apparatus including:

a control unit that performs setting related to a transmission resource depending on a communication parameter decided on the basis of signal power information varying in accordance with a transmit power level, and a communication unit that transmits a frame in accordance with the setting related to the transmission resource.

(2)

The communication apparatus according to (1), in which the communication parameter is decided on the basis of the signal power information and a list of the communication parameters.

(3)

The communication apparatus according to (1) or (2), in which the communication parameter includes a first parameter for deciding a frame transmission waiting time duration, and the control unit sets a frame transmission waiting time on the basis of the first parameter.

(4)

The communication apparatus according to (3), in which the transmission waiting time duration is a feed duration or a variable duration.

(5)

The communication apparatus according to any one of (1) to (4), in which the communication parameter includes a second parameter for deciding an upper limit of a quantity of transmuted data, and the control unit sets a frame length on the basis of the second parameter.

(6)

The communication apparatus according to any one of (1) to (5), in which the communication parameter includes a third parameter for deciding an upper limit of a frame transmission period length, and the control unit sets the frame transmission period length on the basis of the third parameter.

(7)

The communication apparatus according to any one of (1) to (6), in which the communication parameter includes a fourth parameter tor deciding an upper limit of the number of times a frame is retransmitted, and the control unit sets the number of times a frame is retransmitted on the basis of the fourth parameter.

(8)

The communication apparatus according to any one of (1) to (7), in which the communication parameter includes a fifth parameter for deciding a frame transmission frequency, and the control unit sets the frame transmission frequency on the basis of the fifth parameter.

(9)

The communication apparatus according to (8), in which the fifth parameter includes the number of available channels or a channel.

(10)

The communication apparatus according to any one of (1) to (9), in which the control unit controls transmit power of the communication apparatus on the basis of the signal power information acquired through reception.

(11)

The communication apparatus according to (10), in which the communication parameter includes a sixth parameter used to determine presence or absence of transmit power control, and the control unit decides the presence or absence of the transmit power control on the basis of the sixth parameter.

(12)

The communication apparatus according to (10), in which the sixth parameter includes a transmission period attribute or a frame type.

(13)

The communication apparatus according to any one of (2) to (12), in which the communication unit receives a frame including the communication parameter or the list of the communication parameters.

(14)

A communication apparatus including:

a communication unit that transmits information related to a communication parameter decided on the basis of signal power information varying in accordance with a transmit power level.

(15)

The communication apparatus according to (14), further including:

a control unit that deckles the communication parameter on the basis of the signal power information.

(16)

The communication apparatus according to (14) or (15), in which the communication unit transmits a frame including the communication parameter or a list of the communication parameters.

(17)

A communication method including;

causing a control unit to perform setting related to a transmission resource depending on a communication parameter decided on the basis of signal power information varying in accordance with a transmit power level; and transmitting a frame in accordance with the setting related to the transmission resource.

(18)

A communication method including:

causing a communication unit to transmit information related to a communication parameter decided on the basis of signal power information varying in accordance with a transmit power level.

(19)

A program for causing a computer to realize:

a control function of performing setting related to a transmission resource depending on a communication parameter decided on the basis of signal power information varying in accordance with a transmit power level; and a communication function of transmitting a frame in accordance with the setting related to the transmission resource.

(20)

A program for causing a computer to realize:

a communication function of transmuting information related to a communication parameter decided on the basis of signal power information varying in accordance with a transmit power level.

REFERENCE SIGNS LIST

10 STA
11 data processing unit
12 communication unit
13 signal processing unit
14 channel estimation unit
15 wireless interface unit
16 amplification unit
17 control unit
20 AP

The invention claimed is:

1. A communication apparatus comprising:
   control circuitry that performs setting related to a transmission resource depending on a communication parameter decided on a basis of signal power information varying in accordance with a transmit power level, and
   communication circuitry that transmits a frame in accordance with the setting related to the transmission resource;
   wherein the communication parameter includes a second parameter for deciding an upper limit of a quantity of transmitted data, and
   the control circuitry sets a frame length on a basis of the second parameter.

2. The communication apparatus according to claim 1, wherein the communication parameter is decided on the basis of the signal power information and a list of communication parameters.

3. The communication apparatus according to claim 1, wherein the communication parameter includes a first parameter for deciding a frame transmission waiting time duration, and
   the control circuitry sets the frame transmission waiting time duration on a basis of the first parameter.

4. The communication apparatus according to claim 3, wherein the frame transmission waiting time duration is a fixed duration, or a variable duration.

5. The communication apparatus according to claim 1, wherein the communication parameter includes a third parameter for deciding an upper limit of a frame transmission period length, and
   the control circuitry sets the frame transmission, period length on a basis of the third parameter.

6. The communication apparatus according to claim 1, wherein the communication parameter includes a fourth parameter for deciding an upper limit of a number of times the frame is retransmitted, and
   the control circuitry sets the number of times the frame is retransmitted on a basis of the fourth parameter.

7. The communication apparatus according to claim 1, wherein the communication parameter includes a fifth parameter for deciding a frame transmission frequency, and
   the control circuitry sets the frame transmission frequency on a basis of the fifth parameter.

8. The communication apparatus according to claim 7, wherein the fifth parameter includes a number of available channels or a channel.

9. The communication apparatus according to claim 1, wherein the control circuitry controls transmit power of the communication apparatus on the basis of the signal power information acquired through reception.

10. The communication apparatus according, to claim 9, wherein the communication parameter includes a sixth parameter used to determine presence or absence of transmit power control and the control circuitry decides the presence or absence of the transmit power control on a basis of the sixth parameter.

11. The communication apparatus according to claim 10, wherein the sixth parameter includes a transmission period attribute or a frame type.

12. The communication apparatus according to claim 2, wherein the communication circuitry receives a frame including the communication parameter or the list of the communication parameters.

13. A communication apparatus comprising:
communication circuitry that transmits information related to a communication parameter decided on a basis of signal power information varying in accordance with a transmit power level;
wherein the communication parameter includes a second parameter for deciding an upper limit of a quantity of transmitted data, and
the control circuitry sets a frame length on a basis of the second parameter.

14. The communication apparatus according, to claim 13, further comprising:
control circuitry that decides the communication parameter on the basis of the signal power information.

15. The communication apparatus according to claim 13, whereto the communication circuitry transmits a frame including the communication parameter or a list of the communication parameters.

16. A communication method comprising:
causing control circuitry to perform:
setting related to a transmission resource depending on a communication parameter decided on a basis of signal power information varying in accordance with a transmit power level; and
transmitting a frame in accordance with the setting related to the transmission resource;
wherein the communication parameter includes a second parameter for deciding an upper limit of a quantity of transmitted data, and
setting a frame length on a basis of the second parameter.

17. A communication method comprising:
causing communication circuitry to:
transmit information related to a communication parameter decided on a basis of signal power information varying in accordance with a transmit power level;
wherein the communication parameter includes a second parameter for deciding an upper limit of a quantity of transmitted data, and
set a frame length on a basis of the second parameter.

18. A communication apparatus comprising:
control circuitry that performs setting related to a transmission resource depending on a communication parameter decided on a basis of signal power information varying in accordance with a transmit power level, and
communication circuitry that transmits a frame in accordance with the setting related to the transmission resource;
wherein the communication parameter includes a second parameter for deciding an upper limit of a number of times the frame is retransmitted; and
the control circuitry sets the number of times the frame is retransmitted on a basis of the second parameter.

19. The communication apparatus according to claim 18, wherein the communication parameter includes a third parameter for deciding a frame transmission frequency, and
the control circuitry sets the frame transmission frequency on a basis of the third parameter.

20. The communication apparatus according to claim 19, wherein the third parameter includes a number of available channels or a channel.

* * * * *